(12) United States Patent
Mori

(10) Patent No.: US 11,005,952 B2
(45) Date of Patent: May 11, 2021

(54) DATA DISTRIBUTION SYSTEM, MOBILE STATION, DISTRIBUTION DEVICE, DATA DISTRIBUTION METHOD, AND COMPUTER READABLE MEDIUM

(71) Applicant: Mitsubishi Electric Corporation, Tokyo (JP)

(72) Inventor: Ikumi Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 99 days.

(21) Appl. No.: 16/334,166

(22) PCT Filed: Nov. 9, 2016

(86) PCT No.: PCT/JP2016/083174
§ 371 (c)(1),
(2) Date: Mar. 18, 2019

(87) PCT Pub. No.: WO2018/087825
PCT Pub. Date: May 17, 2018

(65) Prior Publication Data
US 2019/0387066 A1    Dec. 19, 2019

(51) Int. Cl.
*H04L 29/08* (2006.01)
*H04L 12/911* (2013.01)

(52) U.S. Cl.
CPC ............ *H04L 67/18* (2013.01); *H04L 47/821* (2013.01); *H04L 67/10* (2013.01); *H04L 67/2842* (2013.01)

(58) Field of Classification Search
None
See application file for complete search history.

(56) References Cited

U.S. PATENT DOCUMENTS

2003/0055924 A1* 3/2003 Matsugatani ........... H04L 29/06
709/220
2004/0014467 A1* 1/2004 O'Neill ................. H04W 8/087
455/422.1
2004/0048618 A1    3/2004 O'Neill et al.
(Continued)

FOREIGN PATENT DOCUMENTS

JP    2003-009207 A    1/2003
JP    2003-092639 A    3/2003
(Continued)

OTHER PUBLICATIONS

International Search Report for PCT/JP2016/083174 (PCT/ISA/210) dated Jan. 24, 2017.

*Primary Examiner* — Backhean Tiv
(74) *Attorney, Agent, or Firm* — Birch, Stewart, Kolasch & Birch, LLP

(57) ABSTRACT

A cache generation instructing section of a mobile station transmits, as a download instruction, an instruction that downloads a data fragment distributed to a mobile body when the mobile body is traveling in a communication area from a contents server. In addition, a cache generation section of a distribution cache node that manages data distribution in the communication area downloads the data fragment from a contents server based on the download instruction and stores the downloaded data fragment in a cache management database of a storage section as a cache.

15 Claims, 24 Drawing Sheets

(56) References Cited

U.S. PATENT DOCUMENTS

| | | | |
|---|---|---|---|
| 2004/0143386 A1* | 7/2004 | Yoshihara | G01C 21/34 701/410 |
| 2007/0234116 A1* | 10/2007 | Yoshikawa | H04L 67/1097 714/13 |
| 2012/0096106 A1* | 4/2012 | Blumofe | G06Q 50/00 709/213 |
| 2014/0359045 A1* | 12/2014 | Mirarchi | H04L 67/2842 709/213 |
| 2016/0081003 A1* | 3/2016 | Ishihara | H04B 7/155 370/338 |
| 2016/0226995 A1* | 8/2016 | Senarath | H04L 67/2847 |
| 2016/0286457 A1* | 9/2016 | O'hare | G01C 21/26 |
| 2017/0086081 A1* | 3/2017 | Kim | H04W 4/027 |
| 2017/0347236 A1* | 11/2017 | Frusina | H04W 28/10 |
| 2018/0020042 A1* | 1/2018 | Couleaud | H04L 67/10 |
| 2019/0208033 A1* | 7/2019 | Vare | H04W 4/44 |
| 2019/0268918 A1* | 8/2019 | Baghel | H04W 72/0406 |
| 2019/0335234 A1* | 10/2019 | Nabeshima | H04N 21/44209 |
| 2019/0387066 A1* | 12/2019 | Mori | H04W 36/026 |

FOREIGN PATENT DOCUMENTS

| | | | | |
|---|---|---|---|---|
| JP | 2004-512773 | A | 4/2004 | |
| JP | 2004-159065 | A | 6/2004 | |
| JP | 2004-282456 | * | 10/2004 | H04Q 7/38 |
| JP | 2004-282456 | A | 10/2004 | |
| JP | 2005-020376 | A | 1/2005 | |
| JP | 2005-348166 | A | 12/2005 | |
| JP | 2010-204949 | * | 9/2010 | G08G 1/09 |
| JP | 2010-204949 | A | 9/2010 | |
| JP | 2010-258994 | A | 11/2010 | |
| JP | 2013-539564 | A | 10/2013 | |
| JP | 2014-003355 | A | 1/2014 | |
| JP | 2014-057161 | A | 3/2014 | |
| JP | 2015-041801 | A | 3/2015 | |
| JP | 2015-079389 | A | 4/2015 | |
| WO | WO 2006/043308 | A1 | 4/2006 | |

* cited by examiner

Fig. 5
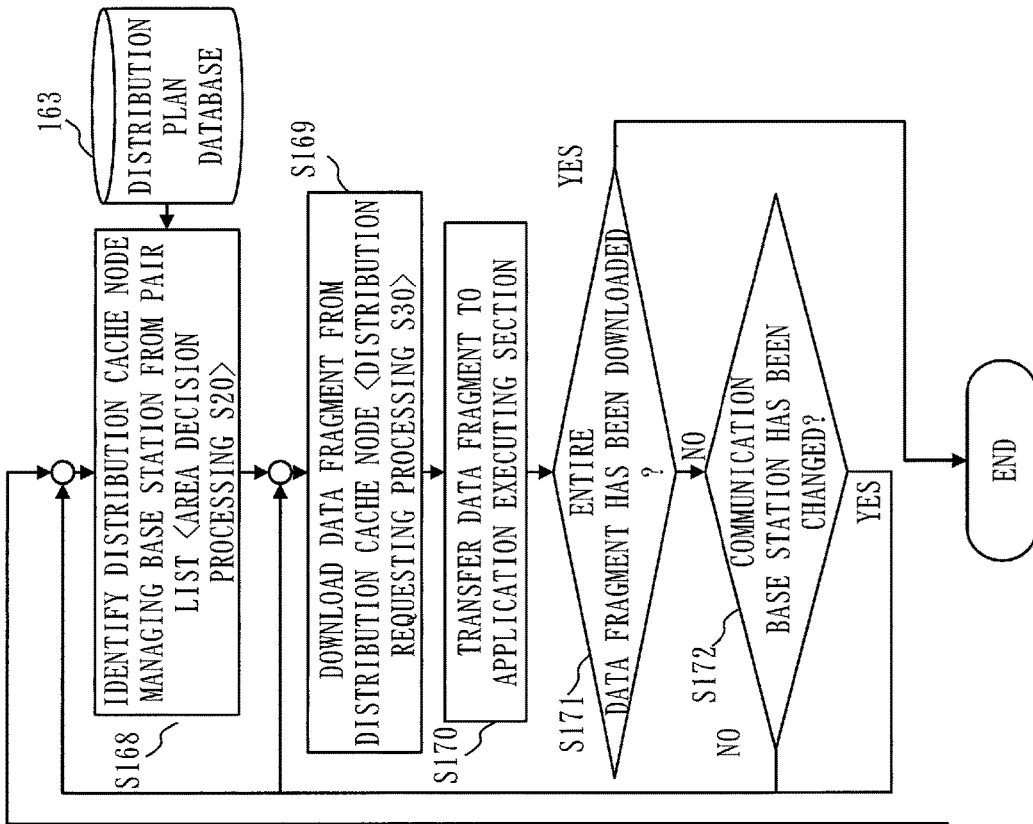
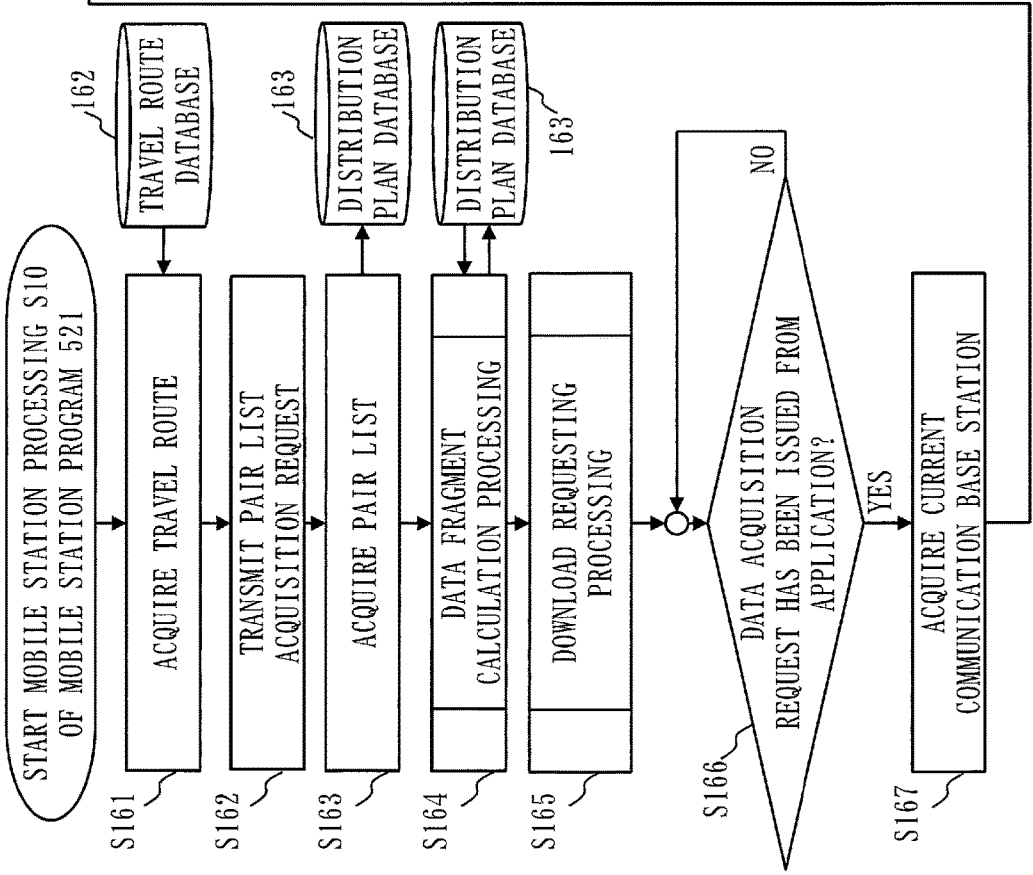

Fig. 8

211: PAIR LIST

| DISTRIBUTION CACHE NODE A IDENTIFIER | DISTRIBUTION CACHE NODE A INFORMATION | BASE STATION A IDENTIFIER | BASE STATION A INFORMATION | BASE STATION B IDENTIFIER | BASE STATION B INFORMATION |
|---|---|---|---|---|---|
| DISTRIBUTION CACHE NODE B IDENTIFIER | DISTRIBUTION CACHE NODE B INFORMATION | BASE STATION C IDENTIFIER | BASE STATION C INFORMATION | | |
| ... | ... | ... | ... | ... | ... |

Fig. 10

| | |
|---|---|
| $D_i$ | • SIZE OF DATA FRAGMENT CACHED BY i-TH DISTRIBUTION CACHE NODE |
| $CS_i$ | • PREDICTED VALUE OF COMMUNICATION SPEED WHEN MOBILE STATION TRAVELS IN COMMUNICATION AREA OF i-TH DISTRIBUTION CACHE NODE<br>• ACQUIRED FROM NETWORK MANAGEMENT DEVICE |
| $T_i$ | • PREDICTED VALUE OF RESIDENCE TIME FOR WHICH MOBILE STATION STAYS IN COMMUNICATION AREA OF i-TH DISTRIBUTION CACHE NODE |
| $WC_i$ | • WEIGHT CONCERNING $CS_i$ $(0 < WC_i)$<br>• CORRECTION COEFFICIENT FOR CONSIDERING EFFECT SUCH AS NUMBER OF MOBILE STATIONS NEAR MOBILE BODY ON $CS_i$ |
| $WT_i$ | • WEIGHT CONCERNING $T_i$ $(0 < WT_i)$<br>• CORRECTION COEFFICIENT FOR CONSIDERING EFFECT SUCH AS TRAFFIC JAM OR ROAD REGULATION |
| $D_{(i-1) \cap i}$ | • SIZE OVERLAPPING WITH DATA FRAGMENT CACHED BY (i − 1)-TH DISTRIBUTION CACHE NODE |
| $D_{i \cap (i+1)}$ | • SIZE OVERLAPPING WITH DATA FRAGMENT CACHED BY (i + 1)-TH DISTRIBUTION CACHE NODE |

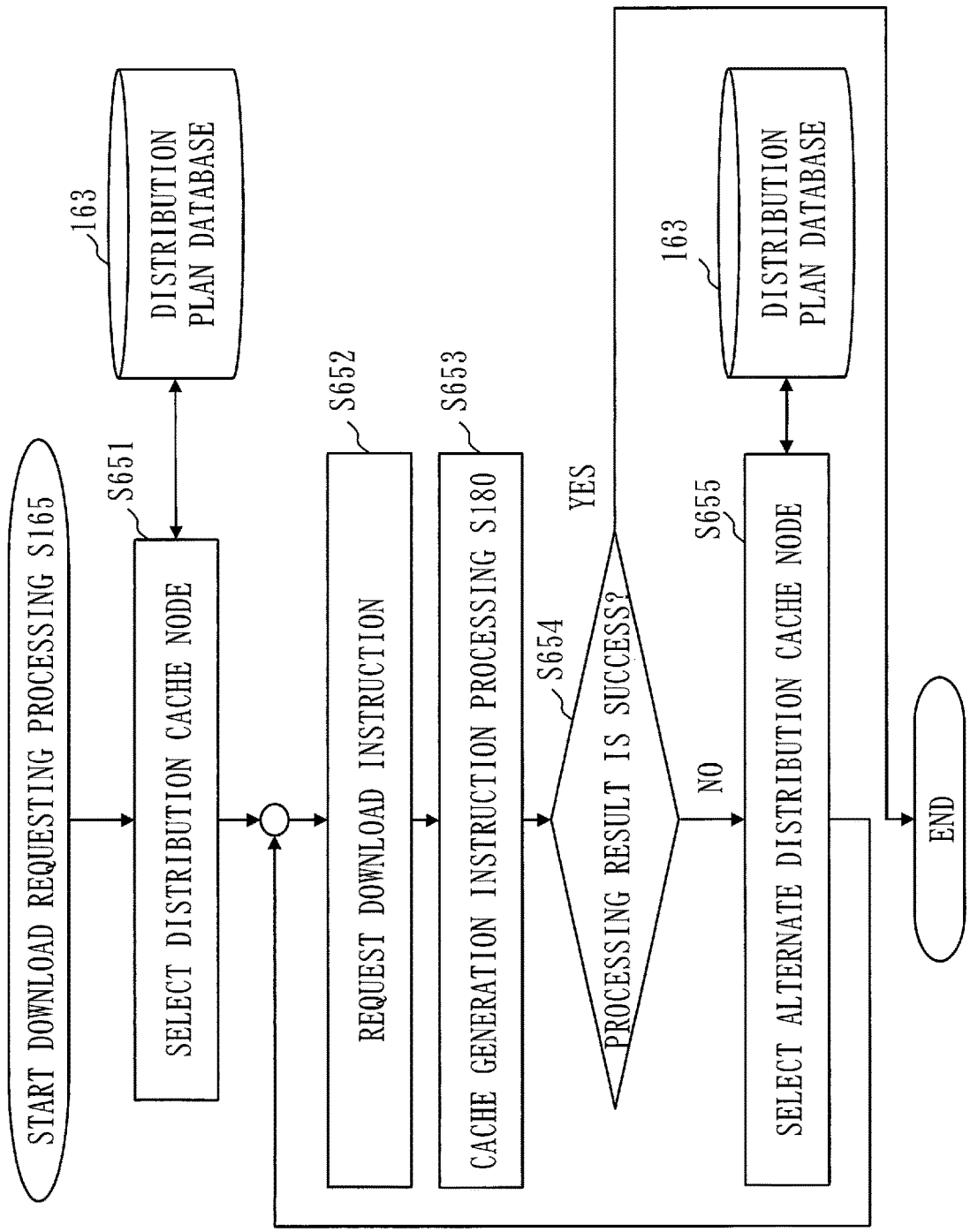

Fig. 13

212 : EXTENDED PAIR LIST

| FLAG | DISTRIBUTION CACHE NODE IDENTIFIER | DISTRIBUTION CACHE NODE INFORMATION | BASE STATION IDENTIFIER | BASE STATION INFORMATION | ⋮ |
|---|---|---|---|---|---|
| NORMAL | DISTRIBUTION CACHE NODE A IDENTIFIER | DISTRIBUTION CACHE NODE A INFORMATION | BASE STATION A IDENTIFIER | BASE STATION A INFORMATION | ⋮ |
| ALTERNATE | DISTRIBUTION CACHE NODE A' IDENTIFIER | DISTRIBUTION CACHE NODE A' INFORMATION | BASE STATION A IDENTIFIER | BASE STATION A INFORMATION | ⋮ |
| ALTERNATE | DISTRIBUTION CACHE NODE A'' IDENTIFIER | DISTRIBUTION CACHE NODE A'' INFORMATION | BASE STATION A IDENTIFIER | BASE STATION A INFORMATION | ⋮ |
| NORMAL | DISTRIBUTION CACHE NODE B IDENTIFIER | DISTRIBUTION CACHE NODE B INFORMATION | BASE STATION C IDENTIFIER | BASE STATION C INFORMATION | ⋮ |
| ⋮ | ⋮ | ⋮ | ⋮ | ⋮ | |

{ NOT CHANGED } (over Distribution Cache Node Information and Base Station columns)

ALTERNATE DISTRIBUTION CACHE NODE (brace over rows 2 and 3)

Fig. 15

REWRITTEN EXTENDED PAIR LIST

| DISTRIBUTION CACHE NODE HAVING ACCEPTED DOWNLOAD INSTRUCTION | | | | |
|---|---|---|---|---|
| ~~NORMAL~~ | ~~DISTRIBUTION CACHE NODE A IDENTIFIER~~ | ~~DISTRIBUTION CACHE NODE A INFORMATION~~ | ~~BASE STATION A IDENTIFIER~~ | ~~BASE STATION A INFORMATION~~ | ⋮ |
| ALTERNATE | DISTRIBUTION CACHE NODE A' IDENTIFIER | DISTRIBUTION CACHE NODE A' INFORMATION | BASE STATION A IDENTIFIER | BASE STATION A INFORMATION | ⋯ |
| ~~ALTERNATE~~ | ~~DISTRIBUTION CACHE NODE A'' IDENTIFIER~~ | ~~DISTRIBUTION CACHE NODE A'' INFORMATION~~ | ~~BASE STATION A IDENTIFIER~~ | ~~BASE STATION A INFORMATION~~ | ⋮ |
| NORMAL | DISTRIBUTION CACHE NODE B IDENTIFIER | DISTRIBUTION CACHE NODE B INFORMATION | BASE STATION C IDENTIFIER | BASE STATION C INFORMATION | ⋯ |
| ⋮ | ⋮ | ⋮ | ⋮ | ⋮ |

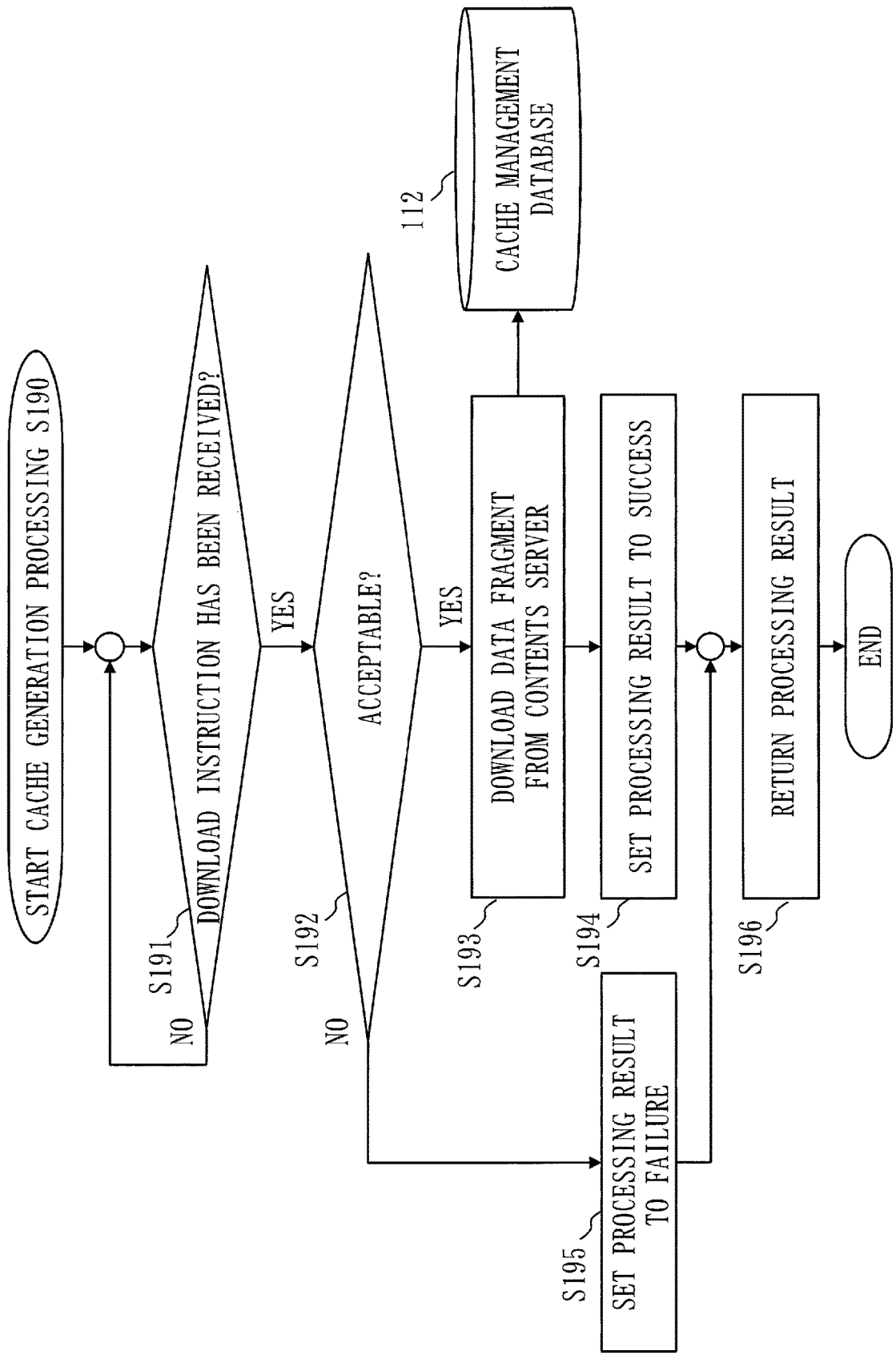

Fig. 21

REWRITTEN PAIR LIST

| DISTRIBUTION CACHE NODE IDENTIFIER | DISTRIBUTION CACHE NODE INFORMATION | BASE STATION IDENTIFIER | BASE STATION INFORMATION |
|---|---|---|---|
| DISTRIBUTION CACHE NODE A' IDENTIFIER | DISTRIBUTION CACHE NODE A' INFORMATION | BASE STATION A IDENTIFIER | BASE STATION A INFORMATION |
| DISTRIBUTION CACHE NODE B IDENTIFIER | DISTRIBUTION CACHE NODE B INFORMATION | BASE STATION C IDENTIFIER | BASE STATION C INFORMATION |
| ... | ... | ... | ... |

REPLACED WITH NEARBY DISTRIBUTION CACHE NODE HAVING ACCEPTED REQUEST (FROM DISTRIBUTION CACHE NODE A TO A')

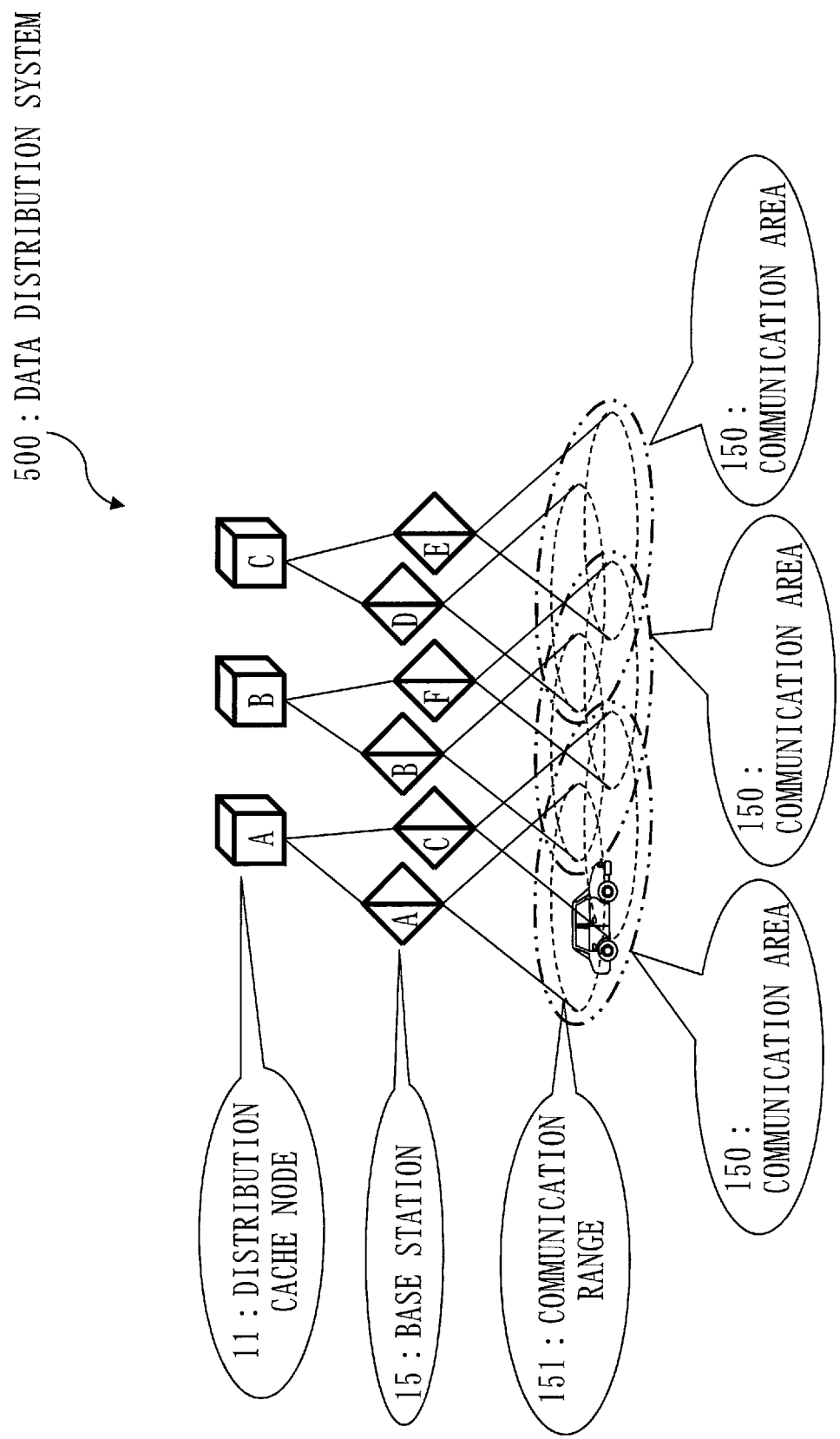

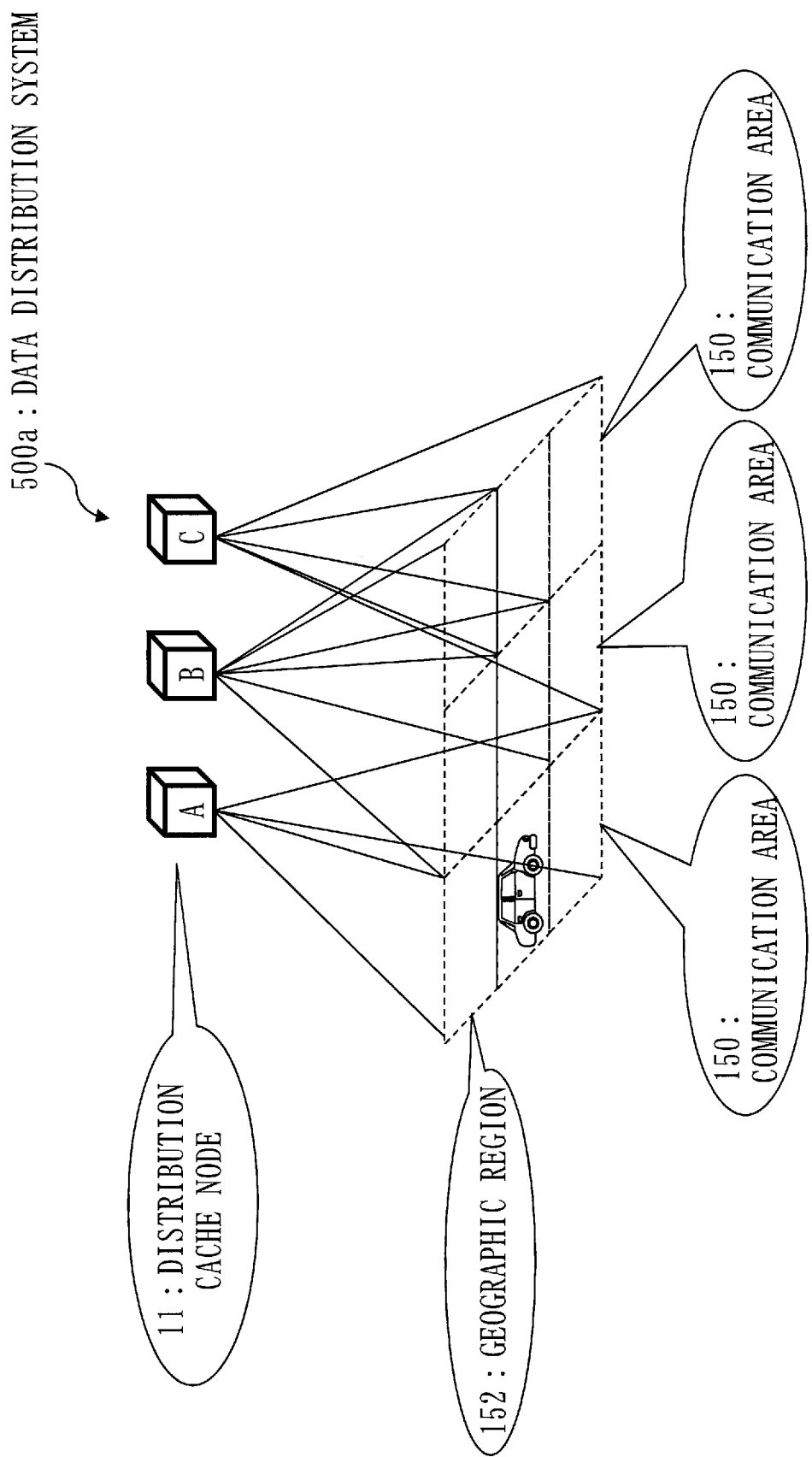

DATA DISTRIBUTION SYSTEM, MOBILE STATION, DISTRIBUTION DEVICE, DATA DISTRIBUTION METHOD, AND COMPUTER READABLE MEDIUM

TECHNICAL FIELD

The present invention relates to a data distribution system, a mobile station, a distribution device, a data distribution method, a mobile station program, and a distribution device program.

BACKGROUND ART

Patent Literature 1 discloses a data distribution system for a mobile body. In this data distribution system, a center server in a wide area network disposes contents data in advance in base stations that communicate with a mobile terminal that is a mobile station based on a planned travel route transmitted from the mobile terminal. Specifically, the wide area network is the Internet. By disposing contents data in advance in base stations that communicate with the mobile terminal, the data distribution system efficiently distributes a large amount of data. The technique in Patent Literature 1 calculates the divided data size used to divide a large amount of data and dispose the divided data in base stations based on the specification information of the communication interface of the mobile terminal. This specification information is transmitted together with the planned travel route from the mobile terminal.

CITATION LIST

Patent Literature

Patent Literature 1: JP-A-2005-20376

SUMMARY OF INVENTION

Technical Problem

In the data distribution system for a mobile body in Patent Literature 1, when the number of mobile stations increases, loads concentrate on the center server and the quality of services may be degraded. In addition, in the data distribution system for a mobile body in Patent Literature 1, the center server performs push distribution of data to base stations and the data is stored in the base stations. Accordingly, when this data distribution system is applied to the current contents distribution service, the center server and the current contents distribution server need to be connected to each other. Accordingly, in this data distribution system, the operation of an existing system needs to be changed. In addition, this data distribution system cannot be applied to base stations that do not have a data storage function.

An object of the present invention is to provide a data distribution system capable of adjusting the scalability of the number of mobile stations without changing the operation of an existing contents distribution service.

Solution to Problem

A data distribution system according to the present invention that distributes contents data stored in a contents server to a mobile body that travels on a travel route that passes through a communication area, the data distribution system includes:

a mobile station installed in the mobile body, the mobile station having a cache generation instructing section that transmits a download instruction downloading, from the contents server as a data fragment, a part of the contents data to be distributed to the mobile body when the mobile body is traveling in the communication area; and a distribution device to manage data distribution in the communication area, the distribution device including a storage section and a cache generation section that receives the download instruction transmitted from the cache generation instructing section, downloads the data fragment from the contents server based on the received download instruction, and stores the downloaded data fragment in the storage section.

Advantageous Effects of Invention

In the data distribution system according to the present invention, the cache generation instructing section of the mobile station transmits, as a download instruction, an instruction that downloads the data fragment to be distributed to the mobile body when the mobile body is traveling in the communication area from the contents server. In addition, the cache generation section of the distribution device that manages data distribution in the communication area downloads the data fragment from the contents server based on the download instruction and stores the downloaded data fragment as a cache in the storage section. Accordingly, since an instruction that downloads the data fragment from the contents server is transmitted from the mobile station in the data distribution system according to the present invention, processing can be distributed to the mobile station and it is possible to adjust an increase in the number of mobile stations.

BRIEF DESCRIPTION OF DRAWINGS

FIG. 5 is a flowchart illustrating mobile station processing S10 of the mobile station program 521 according to the embodiment 1.

FIG. 8 illustrates an example of the pair list 211 received by a distribution plan generation section 161 in the case of the structure in FIG. 1 according to the embodiment 1.

FIG. 10 illustrates the definition of symbols used in the data fragment calculation processing S164 according to the embodiment 1.

FIG. 11 is a flowchart illustrating download requesting processing S165 according to the embodiment 1.

FIG. 13 is a diagram used to describe an extended pair list 212 according to the embodiment 1.

FIG. 15 illustrates a case in which a processing result is a failure in a step S655 in the extended pair list in FIG. 13 according to the embodiment 1.

FIG. 16 is a flowchart illustrating the cache generation processing S190 according to the embodiment 1.

FIG. 21 illustrates an example of the pair list rewritten in a step S657 according to the embodiment 2.

FIG. 23 is an entire structural diagram illustrating the data distribution system 500 according to the embodiment 1 used for comparison with an embodiment 3.

FIG. 24 is an entire structural diagram illustrating a data distribution system 500a according to the embodiment 3.

DESCRIPTION OF EMBODIMENTS

Figure 1:
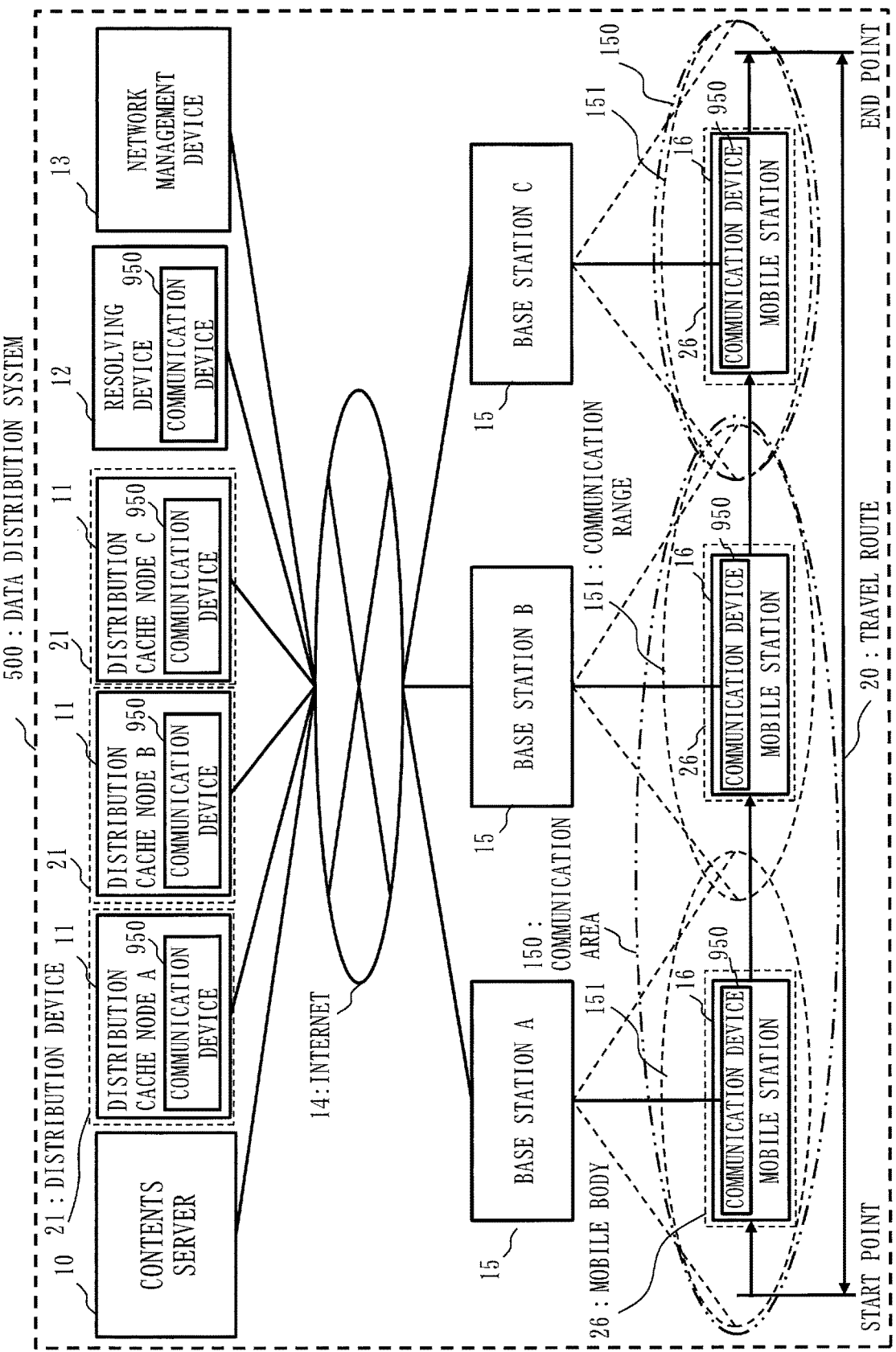
FIG. 1 is a system structural diagram illustrating a data distribution system 500 according to an embodiment 1.

Embodiments of the present invention will be described below with reference to the drawings. It should be noted here that parts that are identical or equivalent to each other are denoted by the same reference numerals. In the description of embodiments, the descriptions of parts that are identical or equivalent to each other are omitted or simplified as appropriate.

Embodiment 1

*Description of the Structure*

The system structure of a data distribution system 500 according to the present embodiment will be described using FIG. 1. The data distribution system 500 distributes contents data stored in a contents server 10 to a mobile body 26 that travels on a travel route 20 that passes through communication areas 150. The data distribution system 500 is also referred to as a mobile communication control system.

In the data distribution system 500, the contents server 10, distribution cache nodes 11, a resolving device 12, a network management device 13, and base stations 15 are connected via an Internet 14 in a wired or wireless manner.

The distribution cache node 11 is an example of a distribution device 21. The mobile body 26 travels on the travel route 20 including the communication areas 150 in which the distribution cache nodes 11 manage data distribution. The communication areas 150 include communication ranges 151 of the base stations 15.

A mobile station 16 is installed in the mobile body 26.

The contents server 10, the distribution cache nodes 11, the resolving device 12, the network management device 13, and the mobile station 16 are computers. Individual devices, which are the contents server 10, the distribution cache nodes 11, the resolving device 12, the network management device 13, and the mobile station 16, have communication devices 950 and communicate via the Internet 14.

In FIG. 1, the contents server 10 stores contents data such as HTML (Hyper Text Markup Language) data, image data, moving image data, music data, advertising data, and application programs. A client of the data distribution system 500 transmits a download request of contents data to the contents server 10 via the distribution cache node 11. The contents server 10 can download data from a specified position in response to the download request of contents data. Specifically, in the case of a download request of moving image data, the contents server 10 can download the moving image data from one hour after the beginning to one hour and thirty minutes after the beginning.

The distribution cache nodes 11 have charge of management of data distribution to the plurality of base stations 15. The distribution cache nodes 11 perform the caching processing of data and the distribution processing of data.

As illustrated in FIG. 1, the travel route 20 passes through the communication areas 150 including the plurality of communication ranges 151 corresponding to the plurality of base stations 15. In addition, the data distribution system 500 has the plurality of distribution devices 21, that is, the plurality of distribution cache nodes 11. In addition, each of the plurality of distribution cache nodes 11 communicates with the base station 15 corresponding thereto of the plurality of base stations 15.

Figure 2:
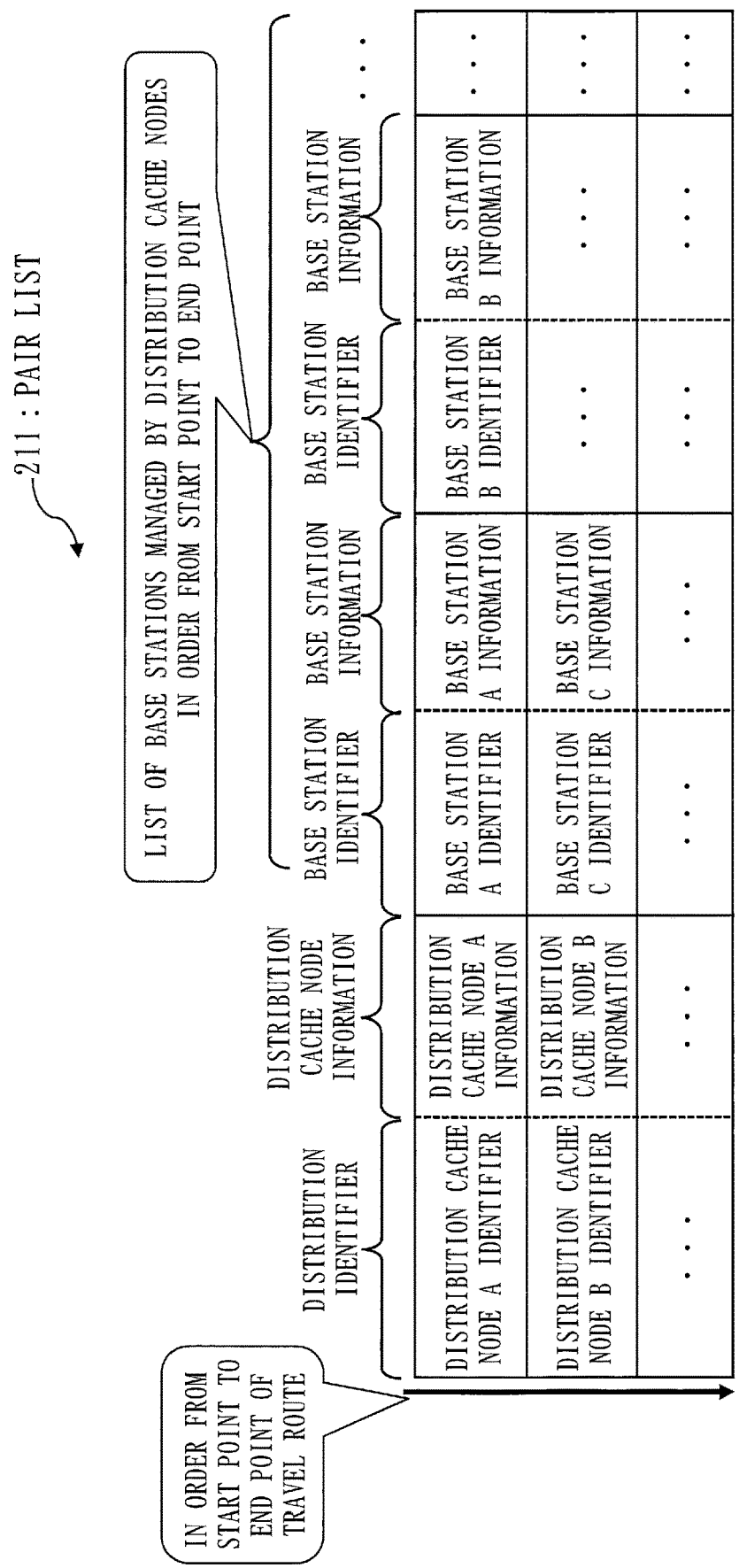
FIG. 2 is a structural diagram illustrating a pair list 211 according to the embodiment 1.

FIG. 2 illustrates the structure of a pair list 211 according to the present embodiment.

The resolving device 12 acquires, from the mobile station 16, the travel route 20, which is a planned route on which the mobile body 26 travels, generates the pair list 211, and returns the generated pair list 211 to the mobile station 16. The resolving device 12 is also referred to as a route-distribution cache node resolving device.

The resolving device 12 generates the pair list 211 based on the travel route 20. In the pair list 211, a plurality of distribution identifiers for identifying the plurality of distribution cache nodes 11, respectively, are arranged in the order of the travel route 20. In addition, in the pair list 211, the plurality of distribution identifiers are respectively associated with the base stations 15 respectively corresponding to the distribution cache nodes 11 identified by the plurality of distribution identifiers, respectively. The base stations 15 corresponding to the distribution cache nodes 11 are the base stations 15 managed by the distribution cache nodes 11. The base stations 15 managed by the distribution cache nodes 11 are the base stations 15 to which the distribution cache nodes 11 distribute data.

As illustrated in FIG. 2, the pair list 211 includes a list of the distribution cache nodes 11 covering the travel route 20 and a list of the base stations 15 managed by the distribution cache nodes 11. These lists are described in the order from the start point to the end point of the travel route 20. The list of the distribution cache nodes 11 includes distribution identifiers and distribution cache node information. The list of the base stations 15 includes base station identifiers and base station information. The distribution cache node information and the base station information include information such as communication situations between the distribution cache nodes 11 identified by the plurality of distribution identifiers and the mobile station 16. Information about the communication situation is used when division calculation (that is, calculation of data fragments) of contents data in the mobile station 16.

The network management device 13 transmits the communication situations between each of the plurality of distribution cache nodes 11 and the mobile station 16 to the resolving device 12. The network management device 13 measures the communication situations between the distribution cache nodes 11 and any mobile station 16 and provides the measured communication situations for the resolving device 12. Specifically, the communication situation is a communication speed.

The base station 15 communicates with the mobile station 16 for distribution of contents data. Specifically, the base station 15 is a base station of a mobile phone, WiMAX, or a wireless LAN or a roadside unit using short range wireless communication such as DSRC (Dedicated Short Range Communication).

The mobile body 26 is a vehicle such as an automobile.

The functional structure of the data distribution system 500 according to the present embodiment will be described using FIG. 1 and FIG. 3.

Figure 3:
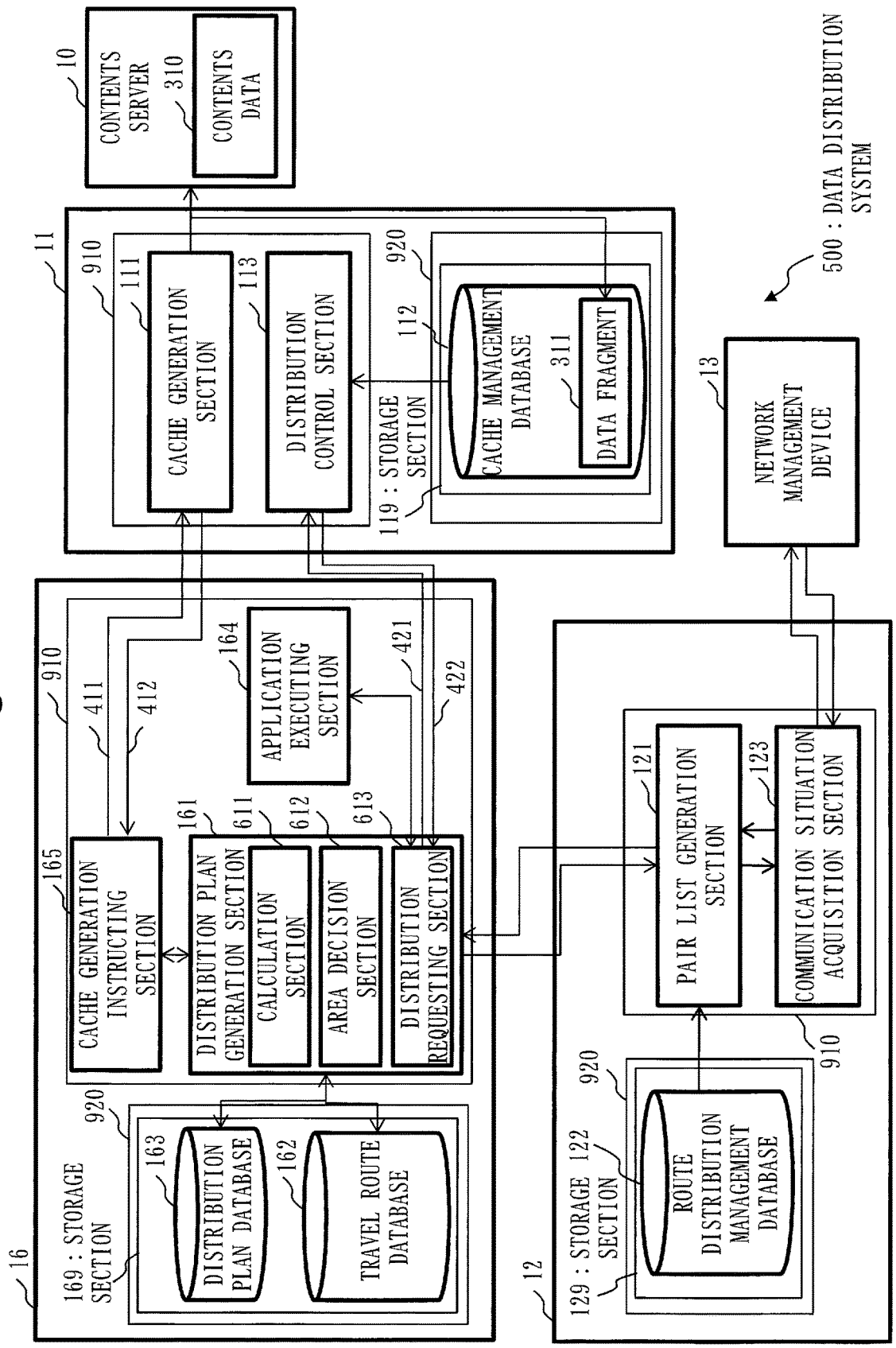
FIG. 3 is a functional structure diagram illustrating the data distribution system 500 according to the embodiment 1.

As illustrated in FIG. 1 and FIG. 3, the mobile station 16, the distribution cache nodes 11, and the resolving device 12 are computers. Each of the mobile station 16, the distribution cache node 11, and the resolving device 12 has hardware such as a processor 910, a storage device 920, and the communication device 950. The storage device 920 includes a memory and an auxiliary storage device. Although these hardware is included in each of the mobile station 16, the distribution cache node 11, and the resolving device 12, the components are denoted by the same reference numerals since they have the same functions.

The mobile station 16 has a functional structure including a distribution plan generation section 161, an application executing section 164, a cache generation instructing section 165, and a storage section 169. The storage section 169 includes a travel route database 162 and a distribution plan database 163. The distribution plan generation section 161 includes a calculation section 611, an area decision section 612, and a distribution requesting section 613. In the following description, the functions of the distribution plan generation section 161, the application executing section 164, and the cache generation instructing section 165 are referred to as the functions of "sections" of the mobile station 16.

In addition, the distribution cache node 11 has a functional structure including a cache generation section 111, a distribution control section 113, and a storage section 119. The storage section 119 includes a cache management database 112. In the following description, the functions of the cache generation section 111 and the distribution control section 113 are referred to as the functions of "sections" of the distribution cache node 11.

In addition, the resolving device 12 has a functional structure including a pair list generation section 121, a communication situation acquisition section 123, and a storage section 129. The storage section 129 includes a route distribution management database 122. In the following description, the functions of the pair list generation section 121 and the communication situation acquisition section 123 are referred to as the functions of "sections" of the resolving device 12.

In the following, the mobile station 16, the distribution cache nodes 11, and the resolving device 12 are also referred to as individual devices. The functions of "sections" of the individual devices are achieved by software.

Although the storage sections 169, 119, and 129 are achieved by auxiliary storage devices, they may be achieved by a memory and an auxiliary storage device or only by a memory. The storage sections 169, 119, and 129 may be achieved by any method.

The processor 910 is connected to other hardware via signal lines and controls the other hardware.

The processor 910 is an IC (Integrated Circuit) that performs calculation processing. The processor 910 is a CPU (Central Processing Unit).

Specifically, the auxiliary storage device is a ROM (Read Only Memory), a flash memory, or a HDD (Hard Disk Drive). Specifically, the memory is a RAM (Random Access Memory).

The communication device 950 includes a receiver and a transmitter. Specifically, the communication device 950 is a communication chip or a NIC (Network Interface Card). The communication device 950 functions as a communication section that communicates data. The receiver functions as a receiving section that receives data and the transmitter functions as a transmitting section that transmits data.

The auxiliary storage devices of the individual devices store programs that achieve the functions of "sections" of the individual devices. The programs that achieve the functions of "sections" of the mobile station 16 are also referred to as mobile station programs 521. In addition, the programs that achieve the functions of "sections" of the distribution device 21 are also referred to as distribution device programs 522. These programs are loaded in the memories of the individual devices, read by the processors 910 of the individual devices, and executed by the processors 910. In addition, the auxiliary storage devices of the individual devices also store OS (Operating System). At least parts of the OS are loaded to the memories and the processors 910 execute the programs that achieve the functions of "sections" while executing the OS.

Each of the individual devices may have only one processor 910 or may have the plurality of processors 910. The plurality of processors 910 may execute the programs that achieve the functions of "sections" in cooperation.

The information, data, signal values, and variable values indicating the results of the processing of "sections" of the individual devices are stored in the auxiliary storage devices, the memories, or the registers or the cache memories in the processors 910 of the individual devices.

It should be noted here that arrows connecting individual sections and storage sections in FIG. 3 indicate that the individual sections store the results of processing in the storage sections or the individual sections read information from the storage sections. In addition, the arrows connecting the individual sections represent flows of control.

The programs that achieve the functions of "sections" may be stored in a transportable recording medium such as a magnetic disc, a flexible disc, an optical disc, a compact disc, a Blu-ray (registered trademark) disc, or a DVD (Digital Versatile Disc).

It should be noted here that a so-called mobile station program product and distribution device program product are a storage medium and a storage device in which a program that achieves the function of a "section" is recorded. A mobile station program product and a distribution device program product include a computer-readable program regardless of the appearance thereof.

\*\*\*Description of the Function\*\*\*

First, the functional structure of the mobile station 16 will be described.

The distribution plan generation section 161 generates the distribution plan of contents data. The distribution plan of contents data is information about the data fragments distributed from the distribution cache nodes 11 depending on the travel route 20 during travel on the travel route 20 by the mobile body 26.

The calculation section 611 of the distribution plan generation section 161 calculates the size of a data fragment 311 from contents data 310 based on the travel route 20 and the communication situation between the distribution cache node 11 and the mobile station 16. The calculation section 611 acquires the pair list 211 from the resolving device 12 and acquires the communication situation based on the acquired pair list 211.

The cache generation instructing section 165 transmits a download instruction 411 that downloads, as the data fragment 311, a part of the contents data 310 to be distributed to the mobile body 26 when the mobile body 26 is traveling in the communication area 150 from the contents server 10. The cache generation instructing section 165 transmits an instruction that downloads the data fragment 311 as the download instruction 411.

The area decision section 612 of the distribution plan generation section 161 decides whether the mobile body 26 is traveling in the communication area 150.

When it is decided that the mobile body 26 is traveling in the communication area 150, the distribution requesting section 613 of the distribution plan generation section 161 transmits a distribution request 421 of the data fragment 311 to the distribution cache node 11.

The travel route database 162 stores the travel route 20 acquired from a car navigation system installed in the mobile body 26. The travel route 20 is a route on which the mobile body 26 having the mobile station 16 will travel.

The distribution plan database 163 stores the pair list 211 and the size of the data fragment 311.

The application executing section 164 uses the contents data 310 distributed from the contents server 10.

Next, the functional structure of the resolving device 12 will be described.

The pair list generation section 121 creates the pair list 211 in response to a request of the pair list 211 from the mobile station 16.

The route distribution management database 122 resolves the distribution cache nodes 11 connected in the order of the travel route 20 and the base stations 15 in the management ranges thereof based on the travel route 20.

The communication situation acquisition section 123 acquires the communication situation including the predicted value of the communication speed from the network management device 13.

Next, the functional structure of the distribution cache node 11 will be described. The cache generation section 111 downloads the data fragment 311 from the contents server 10 in response to the download instruction 411 from the mobile station 16. The cache generation section 111 receives the download instruction 411 transmitted from the cache generation instructing section 165, downloads the data fragment 311 from the contents server 10 based on received download instruction 411, and stores the downloaded data fragment 311 in the storage section 119.

The cache management database 112 of the storage section 119 manages the data fragment 311 downloaded by the cache generation section 111 as a cache.

The distribution control section 113 distributes the data fragment 311 according to the priority. When the distribution control section 113 receives the distribution request 421 from the distribution requesting section 613, the distribution control section 113 distributes the data fragment 311 cached in the storage section 119 to the mobile station 16.

*Description of Operation*

Figure 4:
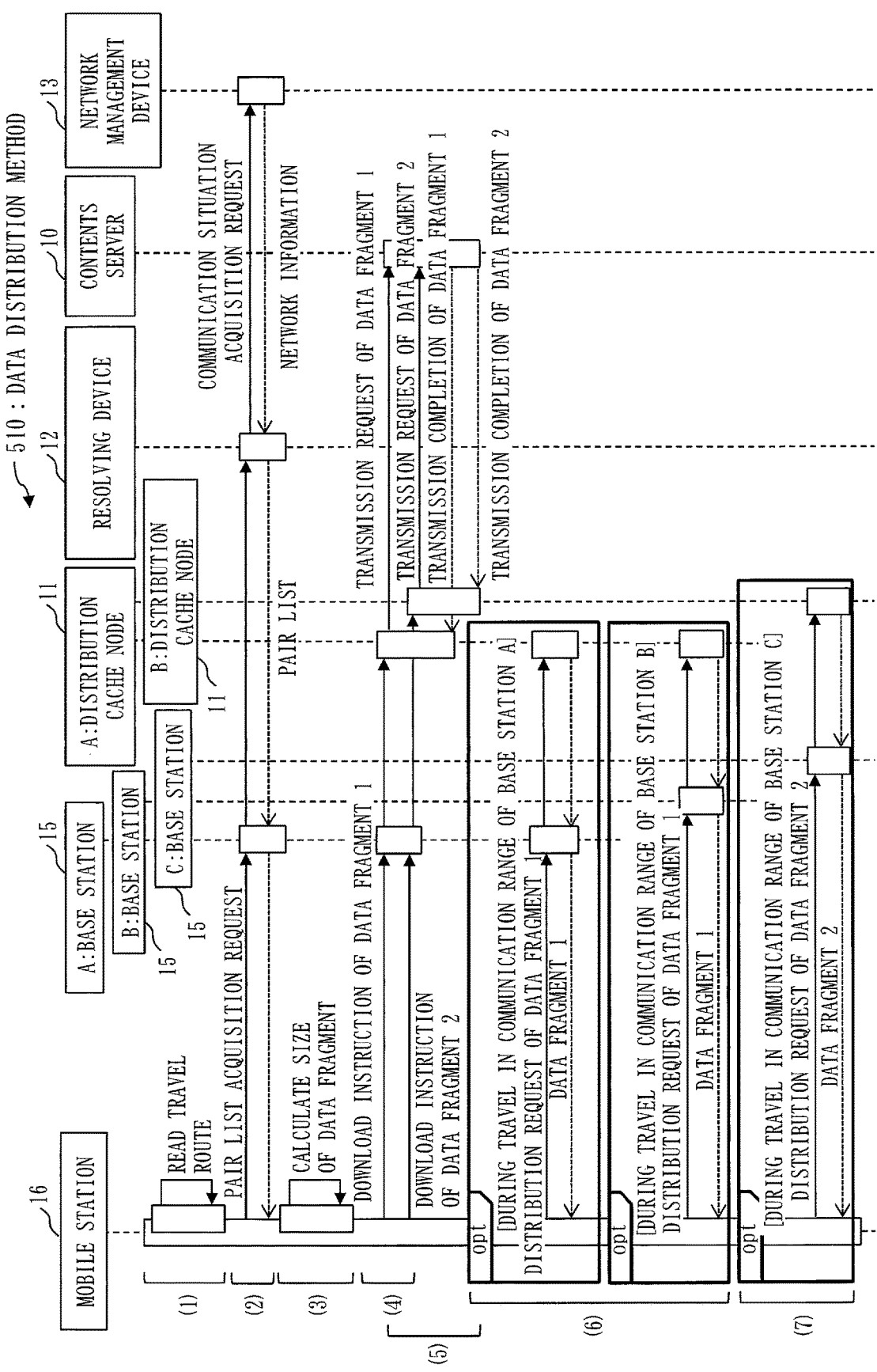
FIG. 4 is a sequence diagram illustrating a data distribution method 510 of the data distribution system 500, mobile station processing of a mobile station program 521, and distribution device processing of a distribution device program 522 according to the embodiment 1.

FIG. 4 is a sequence diagram illustrating a data distribution method 510 of the data distribution system 500 according to the present embodiment, mobile station processing S10 of the mobile station program 521, and data distribution processing S20 of the distribution device program 522. FIG. 5 is a flowchart illustrating the mobile station processing S10 of the mobile station program 521 according to the present embodiment.

Here, it is assumed that the mobile station 16 moves the travel route 20 that passes through the communication ranges 151 of a base station A to a base station C in the case of the structure in FIG. 1. It should be noted here that a distribution cache node A manages the base station A and a base station B. In addition, a distribution cache node B manages the base station C. Accordingly, the communication areas 150 for which data distribution is managed by the distribution cache node A are the communication ranges 151 of the base station A and the base station B. In addition, the communication area 150 for which data distribution is managed by the distribution cache node B is the communication range 151 of the base station C.

<Mobile Station Processing 510>

In a step S161, the calculation section 611 of the distribution plan generation section 161 of the mobile station 16 acquires the travel route 20 in which the mobile station 16 will travel from the travel route database 162. The step S161 corresponds to (1) in FIG. 4.

In a step S162, the calculation section 611 of the distribution plan generation section 161 transmits a pair list acquisition request that requests the acquisition of the pair list 211 to the resolving device 12 via the Internet 14. The pair list acquisition request includes travel route information that represents the travel route 20.

<<Pair List Generation Processing S120 by Resolving Device 12>>

Here, the pair list generation processing S120 that generates a pair list in response to the pair list acquisition request from the mobile station 16 will be described.

Figure 6:
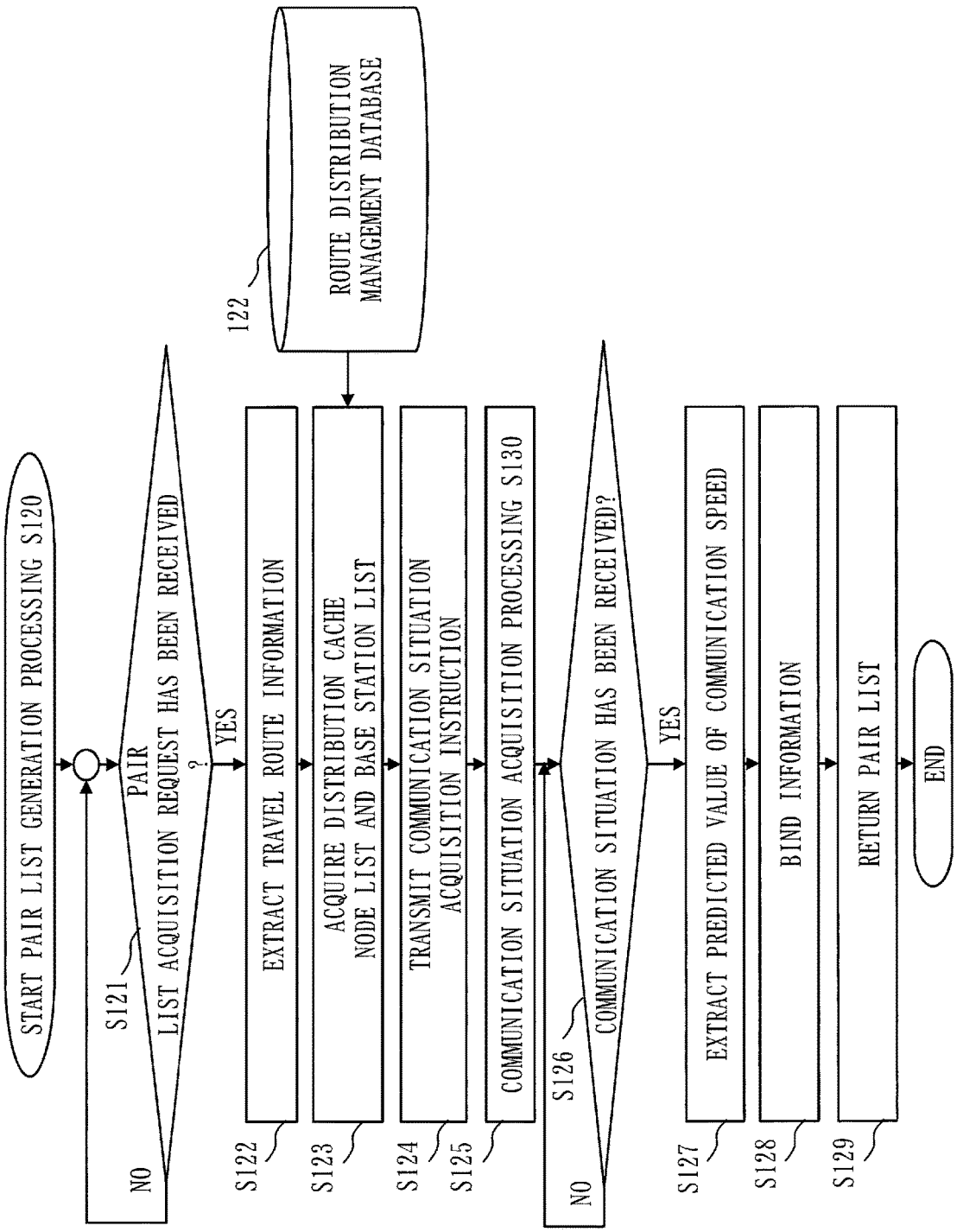
FIG. 6 is a flowchart illustrating pair list generation processing S120 according to the embodiment 1.

FIG. 6 is a flowchart illustrating the pair list generation processing S120 according to the present embodiment.

In a step S121, the pair list generation section 121 of the resolving device 12 decides whether the pair list acquisition request has been received. When the pair list generation section 121 has received the pair list acquisition request, the processing proceeds to a step S122. When the pair list generation section 121 has not received the pair list acquisition request, the step S121 is repeated.

In the step S122, the pair list generation section 121 extracts travel route information from the pair list acquisition request.

In a step S123, the pair list generation section 121 acquires the list of distribution cache nodes 11 to which the mobile station 16 is connected in the order of the travel route 20 and the list of base stations 15 in the management ranges of the distribution cache nodes 11.

In a step S124, the pair list generation section 121 outputs a communication situation acquisition instruction that acquires a communication situation to the communication situation acquisition section 123.

<<Communication Situation Acquisition Processing S130>>

In a step S125, the communication situation acquisition section 123 executes communication situation acquisition processing S130.

Figure 7:
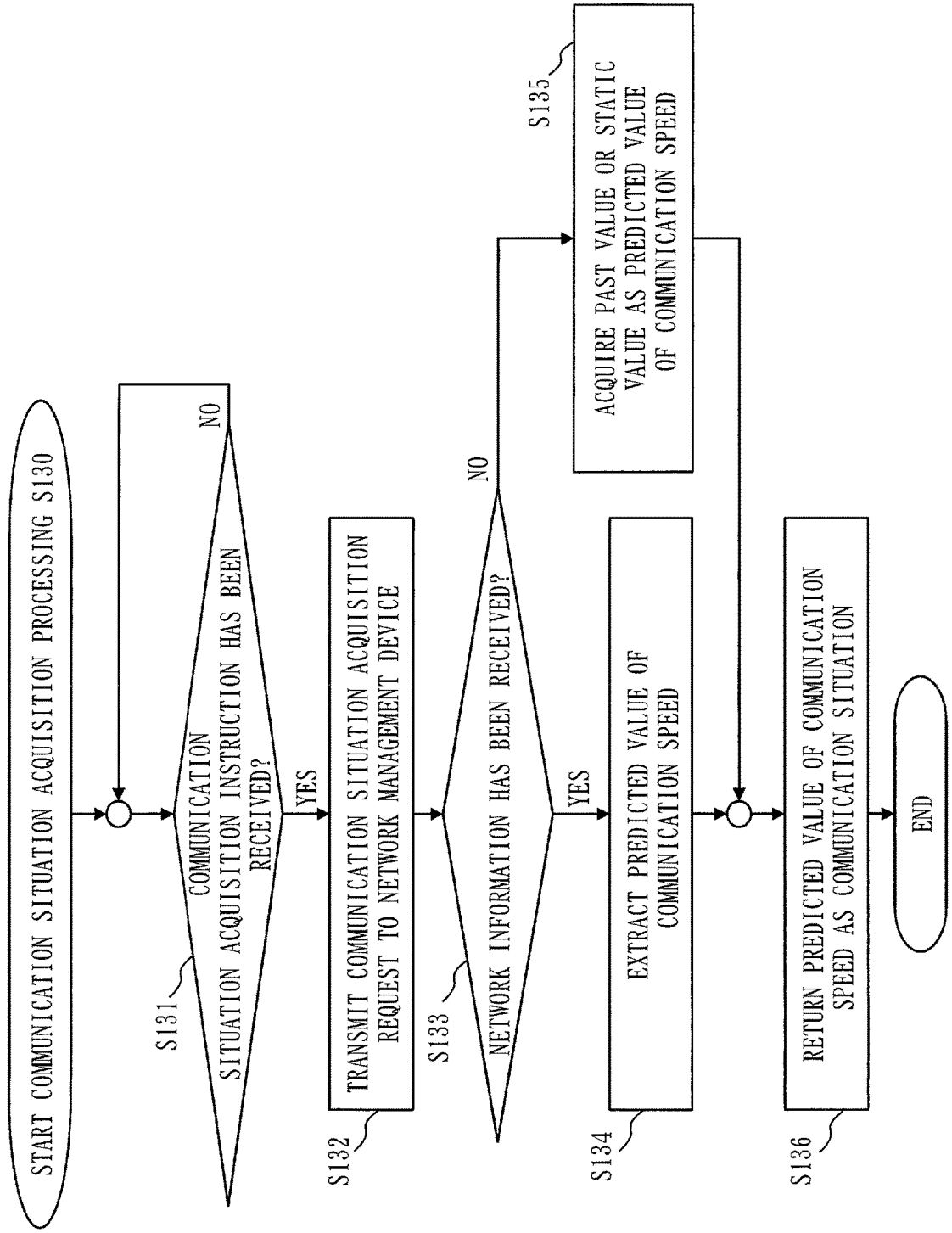
FIG. 7 is a flowchart illustrating communication situation acquisition processing S130 according to the embodiment 1.

FIG. 7 is a flowchart illustrating the communication situation acquisition processing S130 according to the present embodiment.

In a step S131, the communication situation acquisition section 123 decides whether the communication situation acquisition instruction has been accepted. When the communication situation acquisition section 123 has accepted the communication situation acquisition instruction, the processing proceeds to a step S132. When the communication situation acquisition section 123 has not accepted the communication situation acquisition instruction, the step S131 is repeated.

In the step S132, the communication situation acquisition section 123 transmits a communication situation acquisition request to the network management device 13. The network management device 13 transmits, to the communication situation acquisition section 123, network information including the predicted value of the communication speed from the distribution cache node 11 to the mobile station 16.

In a step S133, the communication situation acquisition section 123 decides whether the network information has been received from the network management device 13. When the communication situation acquisition section 123 has received the network information, the processing proceeds to a step S134. In the step S134, the communication situation acquisition section 123 extracts the predicted value of the communication speed from the network information.

In contrast, when the communication situation acquisition section 123 cannot receive the network information or when failure of the processing result is received from the network management device 13, the processing proceeds to a step S135. In the step S135, the communication situation acquisition section 123 acquires a past communication speed value or a static value as a predicted value of the communication speed.

In a step S136, the communication situation acquisition section 123 passes, to the pair list generation section 121, the predicted value of the communication speed as the communication situation in response to the communication situation acquisition instruction.

Now, the communication situation acquisition processing S130 is completed.

Next, the description continues with reference to FIG. 6 again.

In a step S126, the pair list generation section 121 decides whether the communication situation has been acquired. When the pair list generation section 121 has acquired the communication situation, the processing proceeds to a step S127. When the pair list generation section 121 has not acquired the communication situation, the step S126 is repeated.

In the step S127, when the pair list generation section 121 acquires the communication situation, the pair list generation section 121 extracts the predicted value of the communication speed from the communication situation.

In a step S128, the pair list generation section 121 generates the pair list 211 by concatenating a list of the distribution cache nodes 11, a list of the base stations 15, and the predicted value of the communication speed based on the list of the distribution cache nodes 11, the list of the base stations 15, and the predicted value of the communication speed. Specifically, the pair list generation section 121 arranges the plurality of distribution identifiers for respectively identifying the plurality of distribution cache nodes 11 in the order of the travel route 20. Then, the pair list generation section 121 respectively associates the plurality of distribution identifiers with the base stations 15 managed by the distribution cache nodes 11 respectively identified by the plurality of distribution identifiers. The pair list generation section 121 sets, for the plurality of distribution identifiers, the predicted values respectively, of the communication speeds between the distribution cache nodes 11 and the mobile stations 16 identified by the distribution identifiers as the communication situations. In addition, the pair list generation section 121 sets, for the base stations 15, the predicted values of the communication speeds between the distribution cache nodes 11 that manage the base stations 15 and the mobile stations 16 as the communication situations.

In a step S129, the pair list generation section 121 returns the generated pair list 211 to the mobile station 16 in response to the pair list acquisition request.

Now, the pair list generation processing S120 is completed.

Next, the description continues with reference to FIG. 5 again.

In a step S163, the calculation section 611 of the distribution plan generation section 161 receives the pair list 211 in response to the pair list acquisition request. The calculation section 611 stores the pair list 211 in the distribution plan database 163.

FIG. 8 illustrates an example of the pair list 211 received by the distribution plan generation section 161 in the case of the structure illustrated in FIG. 1.

It should be noted here that the processing from the transmission of the pair list acquisition request by the mobile station 16 to the reception of the pair list 211 corresponds to (2) in FIG. 4.

Next, the calculation section 611 performs data fragment calculation processing S164.

In the data fragment calculation processing S164, the calculation section 611 calculates the data fragment 311 from the contents data 310 based on the travel route 20 and the communication situation between the distribution cache node 11 and the mobile station 16. Specifically, the calculation section 611 calculates the size of the data fragment 311 of the contents data to be downloaded by the distribution cache node 11. The calculation section 611 extracts the communication situation of the distribution cache node 11 included in the pair list 211. In addition, the calculation section 611 calculates the residence time of the mobile station 16 in the communication area 150 managed by the distribution cache node 11 based on the travel route 20. The communication area 150 managed by the distribution cache node 11 is referred to as the management range of the distribution cache node 11. Then, the calculation section 611 calculates the size of the data fragment 311 of the contents data to be downloaded by the distribution cache node 11, based on the communication situation of the distribution cache node 11 and the residence time of the mobile station 16 in the management range. In the specific example in FIG. 1, the calculation section 611 calculates the sizes of the data fragments 311 of the contents data 310 to be downloaded by the distribution cache nodes based on the communication situations of the distribution cache nodes A and B and the residence times of the mobile station 16 in the communication areas.

<Data Fragment Calculation Processing S164>

Figure 9:
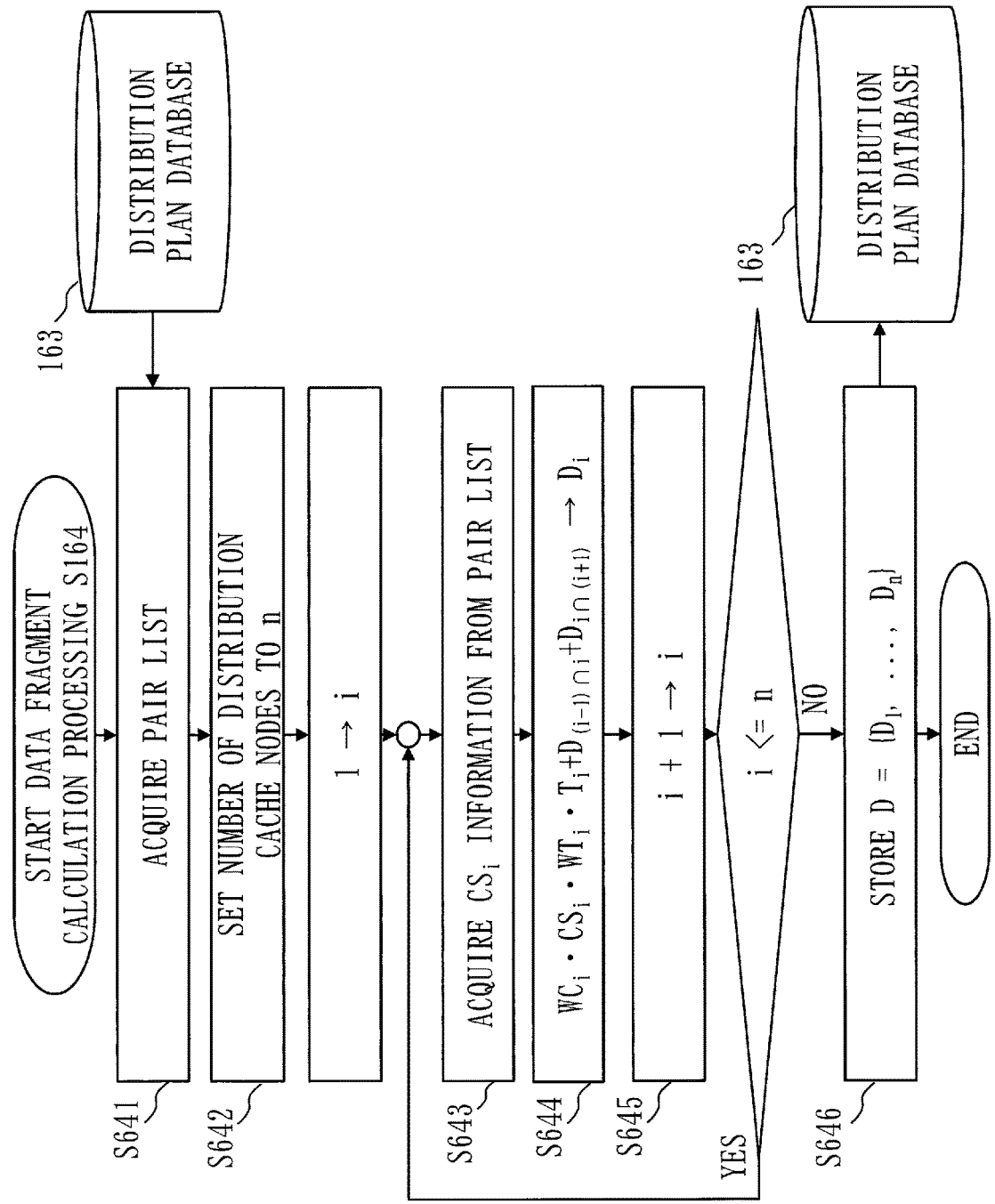
FIG. 9 is a flowchart illustrating data fragment calculation processing S164 according to the embodiment 1.

FIG. 9 is a flowchart illustrating the data fragment calculation processing S164 according to the present embodiment. In addition, FIG. 10 illustrates the definition of symbols used in the data fragment calculation processing S164 according to the present embodiment.

In a step S641, the calculation section 611 of the distribution plan generation section 161 acquires the pair list 211 from the distribution plan database 163.

In a step S642, the calculation section 611 sets a variable n to the number of the distribution cache nodes 11 in the pair list 211.

The calculation section 611 repeats the processing from a step S643 to a step S645 for the first distribution cache node to the n-th distribution cache node in the pair list 211.

In the step S643, the calculation section 611 acquires the predicted value of the communication speed between the i-th distribution cache node and the mobile station from the communication situation in the pair list 211.

In a step S644, the calculation section 611 calculates the size of the data fragment 311 based on a residence time $T_i$ for which the mobile body 26 stays in the communication area 150 of the i-th distribution cache node and a communication speed $CS_i$ in the communication area 150 of the i-th distribution cache node. In addition, the calculation section 611 corrects the size of the data fragment 311 based on the travel environment of the mobile body 26. Specifically, the calculation section 611 calculates a size $D_i$ of the data fragment to be cached in the i-th distribution cache node using an expression 1 below. It should be noted here that the definition of symbols in the expression 1 below is illustrated in FIG. 10.

$$D_i = WC_i * CS_i * WT_i + T_i + D_{(i-1) \cap i} + D_{i \cap (i+1)} \qquad \text{<Expression 1>}$$

As represented in $WC_i$ and $WT_i$ in the expression 1, the predicted value of the communication speed is weighted in consideration of the effect of the travel environment of the mobile body 26. $WC_i$ is weighting that considers the effect of the number of the mobile stations 16 around the mobile body 26 and $WT_i$ is weighting that considers effects such as traffic jam or road regulation. In other words, when the mobile station 16 determines the distribution plan, in the process of calculating the size of data to be cached by the distribution cache node, learnable correction coefficients $WC_i$ and $WT_i$ are used in the calculating expression so that the difference between the planned value and the actual value is gradually reduced. In addition, the size $D_i$ includes the data size overlapping with the data fragment cached by the (i−1)th distribution cache node and the data size overlapping with the data fragment cached by the (i+1)th distribution cache node as represented by $D_{(i-1) \cap i} + D_{i \cap (i+1)}$ in the expression 1.

In the step S645, the calculation section 611 increments i.

The calculation section 611 repeats the processing from the step S643 to the step S645 for i=1 to n.

In a step S646, the calculation section 611 stores the data fragment size D={D1, . . . , Dn} calculated in the step S644 in the distribution plan database 163.

Now, the data fragment calculation processing S164 is completed. It should be noted here that the data fragment calculation processing S164 corresponds to (3) in FIG. 4.

The description continues with reference to FIG. 5 again.

Next, the distribution plan generation section 161 executes download requesting processing S165. The download requesting processing S165 corresponds to (4) in FIG. 4.

In the download requesting processing S165, the distribution plan generation section 161 requests the cache generation instructing section 165 to transmit the download instruction 411 to the distribution cache node that downloads the data fragment of contents data. When the distribution cache node cannot accept the download instruction, an alternate distribution cache node needs to take over the processing. The download instruction is also referred to as a data fragment download instruction that instructs the distribution cache node to download the data fragment.

<Download Requesting Processing S165>

Figure 12:
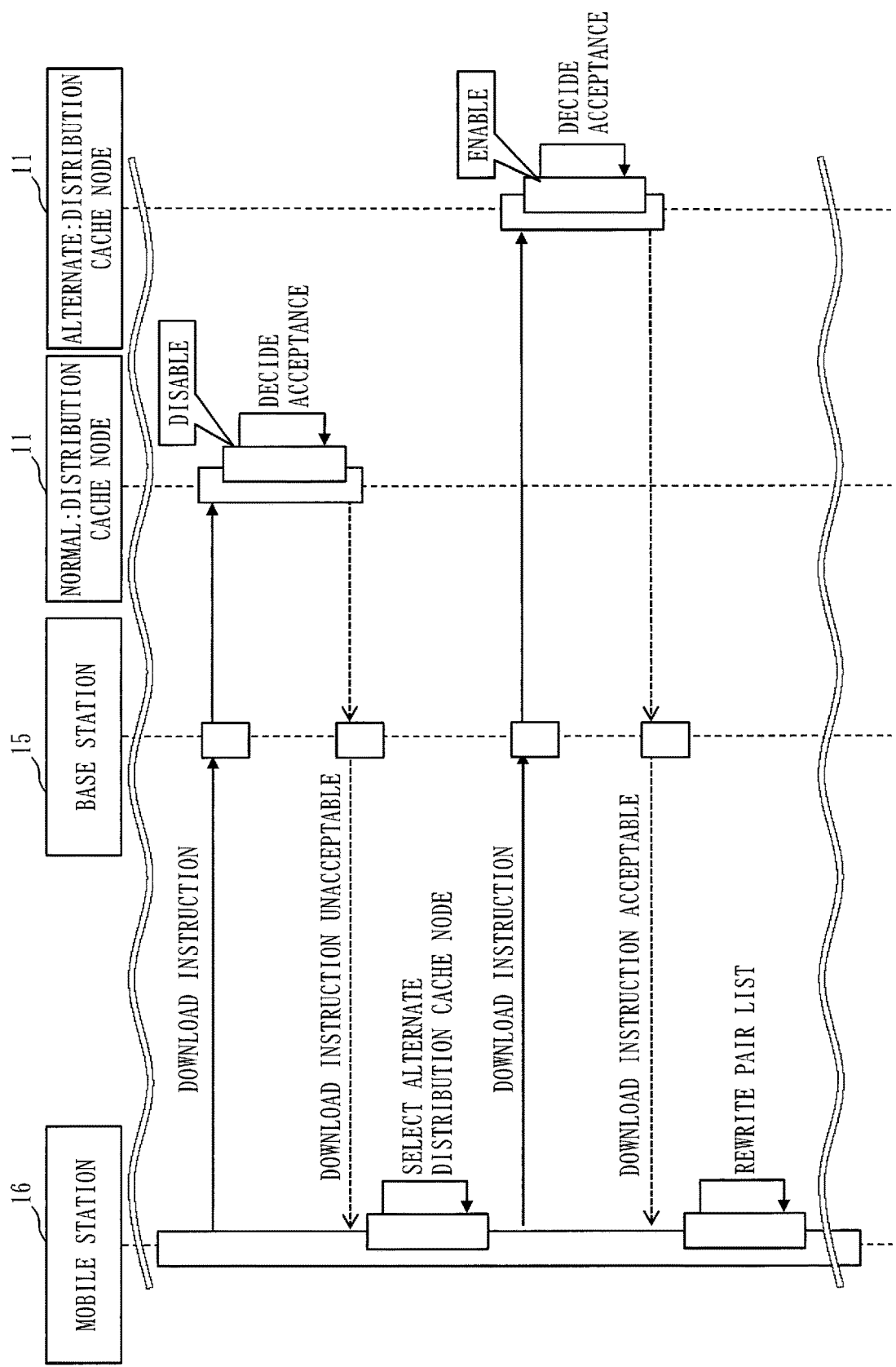
FIG. 12 is a sequence diagram illustrating the download requesting processing S165 according to the embodiment 1.

FIG. 11 is a flowchart illustrating the download requesting processing S165 according to the present embodiment. FIG. 12 is a sequence diagram illustrating the download requesting processing S165 according to the present embodiment.

In the download requesting processing S165, when the distribution cache node cannot accept the download instruction, an alternate distribution cache node is selected using an extended pair list 212 obtained by extending the pair list 211.

The extended pair list 212 according to the present embodiment will be described with reference to FIG. 13. The extended pair list is obtained by extending the pair list as illustrated in FIG. 13.

As illustrated in FIG. 13, the extended pair list 212 newly includes a flag column. The flag column represents whether the distribution cache node is a normal distribution cache node or an alternate distribution cache node. In the extended pair list 212, the distribution cache node having a "normal" flag is used first. In addition, in the extended pair list, when the distribution cache node having the "normal" flag cannot be used, the distribution cache node having an "alternate" flag is used. A plurality of rows including an "alternate" flag may be provided as needed. Furthermore, a field in which a value such as priority is set may be provided in addition to the flag.

When the mobile station 16 receives the pair list 211 from the resolving device 12, the mobile station 16 also receives the extended pair list 212. The resolving device 12 also acquires information of an alternate distribution cache node when creating a pair list and creates the extended pair list 212. Alternatively, when the mobile station 16 cannot acquire information of the extended pair list 212 from the resolving device 12, the mobile station 16 may generate the extended pair list 212 by searching for an alternate distribution cache node. The mobile station 16 stores the extended pair list 212 in the distribution plan database 163.

In a step S651, the distribution plan generation section 161 acquires the extended pair list 212 from the distribution plan database 163. The distribution plan generation section 161 selects a distribution cache node from the extended pair list 212.

In a step S652, the distribution plan generation section 161 requests the cache generation instructing section 165 to transmit a download instruction to the distribution cache node 11.

In a step S653, the cache generation instructing section 165 executes cache generation instruction processing S180.

<Cache Generation Instruction Processing S180>

Figure 14:
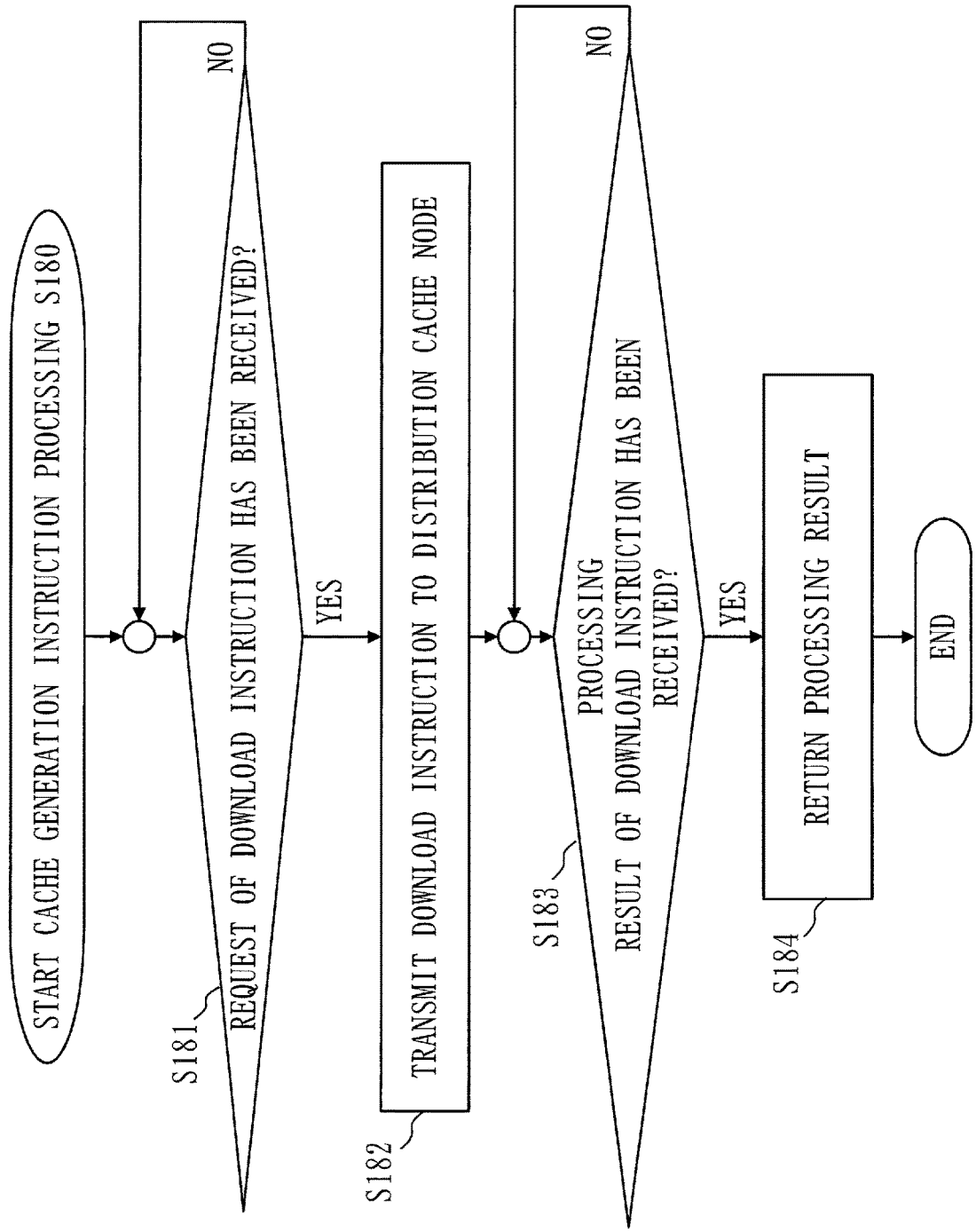
FIG. 14 is a flowchart illustrating cache generation instruction processing S180 according to the embodiment 1.

FIG. 14 is a flowchart illustrating the cache generation instruction processing S180 according to the present embodiment. In the cache generation instruction processing S180, the cache generation instructing section 165 transmits, to the distribution cache node, a download instruction that downloads the data fragment 311 of contents data distributed to the mobile body 26 when the mobile body 26 is traveling in the communication area 150 from the contents server 10.

In a step S181, the cache generation instructing section 165 decides that a request of the download instruction has been acquired. When the cache generation instructing section 165 has acquired the request of the download instruction, the processing proceeds to a step S182. When the cache generation instructing section 165 has not acquired the request of the download instruction, the step S181 is repeated.

In the step S182, the cache generation instructing section 165 transmits the download instruction to the cache generation section 111 of the distribution cache node 11. The download instruction includes the identifier of data to be downloaded and the data position of the data to be downloaded. Specifically, the data position includes the start point and the end point of the contents data to be downloaded. The start point and the end point of the contents data are obtained as described below. Of the contents data requested by an application of the mobile station 16, the downloaded size is the offset value of the contents data, that is, the start point of the data. Of the contents data requested by the application of the mobile station 16, the downloaded size is known. The end point of the contents data is the position obtained by adding the predefined fixed length (that is, the size of a data fragment) to the offset. Specifically, when the start point of the data is 10 KB and the fixed length is 1 KB, the end point of the data is 11 KB.

In a step S183, the cache generation instructing section 165 decides whether the processing result from the cache generation section 111 of the distribution cache node 11 has been received. When the cache generation instructing section 165 has received the processing result, the processing proceeds to a step S184. When the cache generation instructing section 165 has not received the processing result, the step S183 is repeated.

In the step S184, the cache generation instructing section 165 returns the processing result to the distribution plan generation section 161.

Now, the cache generation instruction processing S180 is completed.

The description continues with reference to FIG. 11 again.

In a step S654, the distribution plan generation section 161 decides whether the processing result is success. When the processing result is failure, the processing proceeds to a step S655. When the processing result is success, the processing ends.

In the step S655, the distribution plan generation section 161 deletes the row of the distribution cache nod currently being processed from the extended pair list 212. Then, the distribution plan generation section 161 selects the next alternate distribution cache node from the extended pair list 212. Then, the processing returns to the step S652 and the distribution plan generation section 161 outputs a download instruction request of the alternate distribution cache node to the cache generation instructing section 165.

FIG. 15 illustrates the case in which the processing result is failure in the step S655 in the extended pair list in FIG. 13.

FIG. 15 indicates that the distribution cache node on the first row for which the processing result is failure is deleted and the processing result is success for the alternate distribution cache node selected next. Since the distribution cache node on the first row has been deleted and fragment downloading has succeeded in the alternate distribution cache node on the next line, the alternate distribution cache node on the row after the next has been deleted.

<Cache Generation Processing S190>

FIG. 16 is a flowchart illustrating cache generation processing S190 according to the present embodiment. The cache generation processing S190 is executed by the cache generation section 111 of the distribution cache node 11. The cache generation processing S190 corresponds to (5) in FIG. 4. When the cache generation processing S190 receives the download instruction 411, the cache generation processing S190 downloads the data fragment 311 from the contents server 10 based on the received download instruction 411. Then, the cache generation processing S190 stores the downloaded data fragment 311 in the storage section 119 as a cache.

In a step S191, the cache generation section 111 decides whether the download instruction 411 has been received from the cache generation instructing section 165 of the mobile station 16. When the cache generation section 111 has received the download instruction 411, the processing proceeds to a step S192. When the cache generation section 111 has not received the download instruction 411, the processing repeats the step S191.

In the step S192, the cache generation section 111 decides whether the download instruction is acceptable by checking available resources in the cache management database 112. When the download instruction is acceptable, the processing proceeds to a step S193. When the download instruction is not acceptable, the processing proceeds to a step S196.

In the step S193, the cache generation section 111 downloads the data fragment 311 from the contents server 10 and stores the data fragment in the cache management database 112.

In a step S194, the cache generation section 111 sets the processing result to success.

In a step S195, the cache generation section 111 sets the processing result to failure.

In the step S196, the cache generation section 111 returns the processing result to the mobile station 16.

Now, the cache generation processing S190 is completed.

The process corresponding to (6) in FIG. 4 will be described with reference to FIG. 5 again.

While the mobile station 16 travels in the communication ranges 151 of the base station A and the base station B, that is, while the mobile station 16 travels in the communication area 150 of the distribution cache node A, the mobile station 16 downloads the data fragment of contents data from the distribution cache node A.

In a step S166, the distribution plan generation section 161 of the mobile station 16 decides whether the application executing section 164 requests the acquisition of contents data. When the distribution plan generation section 161 has detected that the application executing section 164 requests the acquisition of contents data, the processing proceeds to a step S167. When the distribution plan generation section 161 does not detect that the application executing section 164 requests the acquisition of contents data, the step S166 is repeated.

In the step S167, the area decision section 612 of the distribution plan generation section 161 acquires the identifier of the currently communicating base station. The currently communicating base station is referred to as a communicating base station.

In a step S168, the area decision section 612 of the distribution plan generation section 161 reads a pair list from the distribution plan database 163. The distribution plan generation section 161 identifies the distribution cache node that manages the communicating base station based on the pair list. In (6) in FIG. 4, the communicating base station is identified as the base station A or the base station B and the distribution cache node is identified as the distribution cache node A.

The step S167 and the step S168 are examples of the area decision processing S20 that decides whether the mobile body 26 is traveling in the communication area 150 managed by distribution cache node.

In a step S169, when it is decided that the mobile body 26 is traveling in the communication area 150, the distribution requesting section 613 of the distribution plan generation section 161 transmits the distribution request 421 of the data fragment 311 to the distribution cache node 11 corresponding to the communication area 150. Then, the distribution requesting section 613 of the distribution plan generation section 161 receives the data fragment 311 from the distribution control section 113 of the distribution cache node 11 in response to the distribution request 421. The distribution request 421 includes the data position of the contents data to be requested. The data position of the contents data included in the distribution request 421 is assumed to be the data start position and the data end position. That is, the distribution requesting section 613 of the distribution plan generation section 161 downloads the data fragment 311 from the distribution cache node 11.

The step S169 is an example of distribution requesting processing S30 that transmits the distribution request of the data fragment 311 to the distribution cache node 11 when it is decided that the mobile body 26 is traveling in the communication area 150.

<Distribution Control Processing S210>

Figure 17:
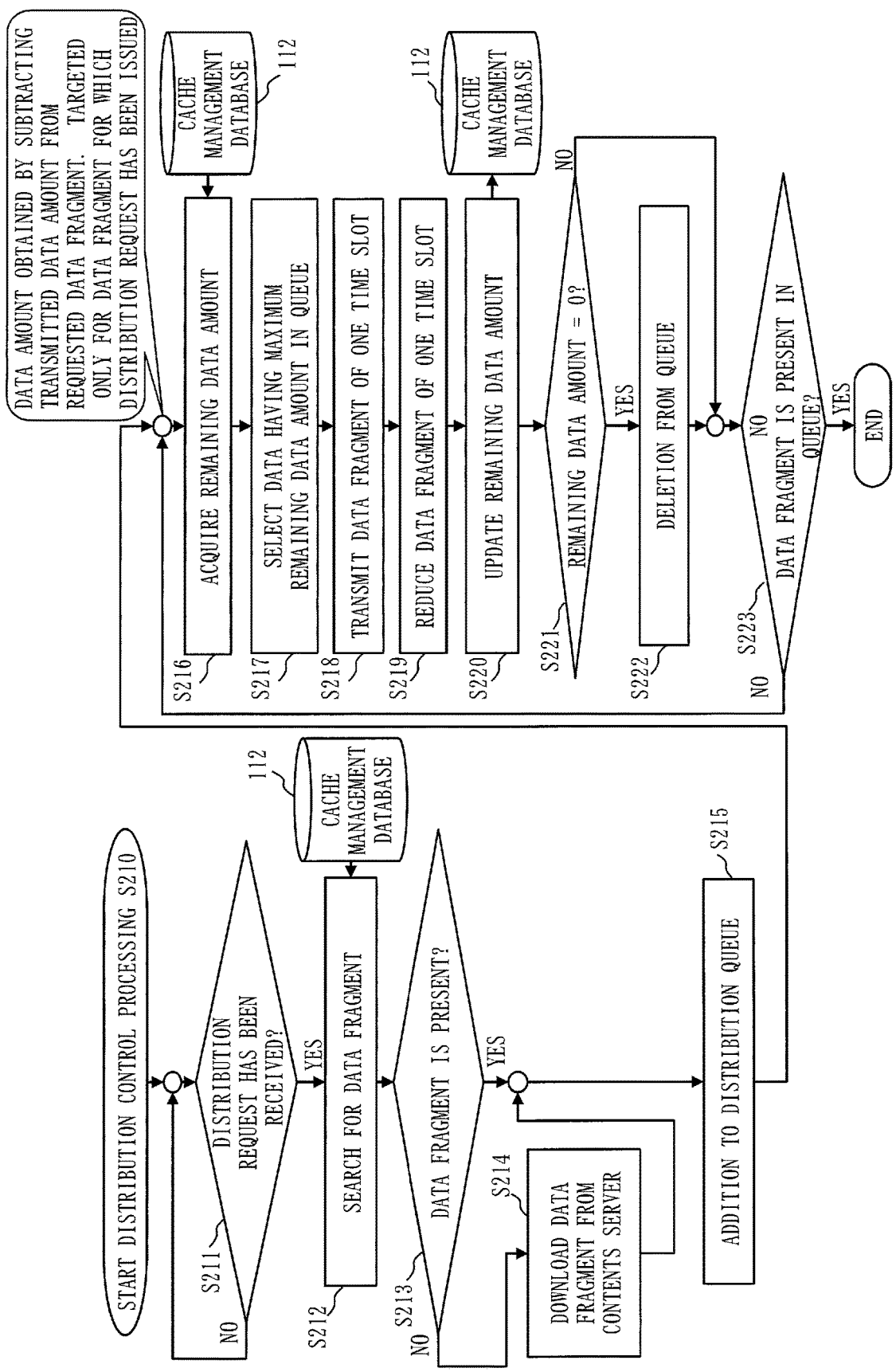
FIG. 17 is a flowchart illustrating distribution control processing S210 according to the embodiment 1.

FIG. 17 is a flowchart illustrating distribution control processing S210 according to the present embodiment. The distribution control processing S210 is executed by the distribution control section 113 of the distribution cache node 11. In the distribution control processing S210, when the distribution control section 113 receives the distribution request 421 that requests the distribution of a data fragment from the mobile station 16, the distribution control section 113 distributes the data fragment 311 stored in the cache management database 112 of the storage section 119 to the mobile station 16 based on the distribution request 421.

In a step S211, the distribution control section 113 decides whether the distribution request 421 has been received. When the distribution request 421 has been received, the processing proceeds to a step S212. When the distribution request 421 has not been received, the step S211 is repeated.

In the step S212, the distribution control section 113 searches the cache management database 112 for the requested data fragment.

In a step S213, the distribution control section 113 decides whether the data fragment is present in the cache management database 112. When the data fragment is not present, the processing proceeds to a step S214. When the data fragment is present, the processing proceeds to a step S215.

In the step S214, the distribution control section 113 downloads the data fragment from the contents server 10 and the processing proceeds to the step S215.

In the step S215, the distribution control section 113 adds the data fragment in a distribution queue.

In a step S216, the distribution control section 113 acquires the remaining data amounts of all data fragments in the queue from the cache management database 112. However, the remaining data amount represents the data amount obtained by subtracting the transmitted data amount from the data fragment for which a distribution request is performed.

In a step S217, the distribution control section 113 selects the data fragment having the largest remaining data amount in the queue.

In a step S218, the distribution control section 113 transmits the data fragment corresponding to one time slot. At this time, the distribution control section 113 cuts out data from the data fragment based on the data start position and the data end position included in the distribution request 421. Then, the distribution control section 113 transmits the data corresponding to one time slot of the cut out data.

In a step S219, the distribution control section 113 subtracts the data corresponding to one time slot from the data fragment.

In a step S220, the distribution control section 113 updates the remaining data amount of the cache management database 112.

In a step S221, the distribution control section 113 decides whether the remaining data amount is zero. When the remaining data amount is zero, the processing proceeds to a step S222. When the remaining data amount is not 0, the processing proceeds to a step S223.

In the step S222, the distribution control section 113 deletes the data fragment from the queue because the remaining data amount is zero.

In the step S223, the distribution control section 113 decides whether the data fragment is present in the queue. When the data fragment is not present eventually in the queue, the processing ends. When the data fragment is present eventually in the queue, the processing returns to the step S216 and continues from the acquisition of the remaining data amount.

As described above, the distribution control section 113 transmits the part of the data fragment corresponding to the time slot to the mobile station 16. After receiving a distribution request, the distribution control section 113 controls the distribution of the data fragment based on the remaining data amount obtained by subtracting the transmitted data amount from the data fragment.

The data fragment is processed by being divided into parts corresponding to one time slot to suppress starvation. Starvation means that a service with low priority is not executed forever.

The distribution control processing S210 described above downloads the data fragment from the distribution control section 113 of the distribution cache node 11 to the distribution plan generation section 161 of the mobile station 16.

The description continues with reference to FIG. 5 again.

In a step S170, the distribution plan generation section 161 transfers the data fragment to the application executing section 164.

In a step S171, the distribution plan generation section 161 decides whether all data fragments of contents data have been downloaded. When all data fragments have been downloaded, the processing ends. When a part of the data fragments is not downloaded, the processing proceeds to a step S172.

In the step S172, the distribution plan generation section 161 decides whether the communication base station has been changed. When the communication base station has been changed, the processing returns to the step S168 and the distribution plan generation section 161 redoes the processing from the identification of the distribution cache node that manages the communication base station from the pair list to the step S172. When the communication base station has not changed, the processing returns to the step S169 and the distribution plan generation section 161 redoes the processing from the reception of the data fragment from the distribution control section 113 of the distribution cache node 11 to the step S172.

Next, the processing corresponding to (7) in FIG. 4 will be described. (7) in FIG. 4 represents the processing while the mobile station 16 travels in the communication range 151 of the base station C, that is, while the mobile station 16 travels in the communication area 150 of the distribution cache node B. While the mobile station 16 travels in the communication range 151 of the base station C, the mobile station 16 downloads the data fragment of contents data from the distribution cache node B. This processing is the same as the download processing (that is, the processing corresponding to (6) in FIG. 4) performed by the mobile station 16 to the data fragment of contents data from the distribution cache node A.

*Other Structures*

The individual devices, which are the mobile station 16, the distribution cache nodes 11, and the resolving device 12, may have input interfaces and output interfaces.

The input interfaces are ports to be connected to input devices such as a mouse, a keyboard, and a touch panel. Specifically, the input interfaces are USB (Universal Serial Bus) terminals. It should be noted here that the input interfaces may be ports to be connected to a LAN (Local Area Network).

In addition, the output interfaces are ports to which cables of display devices such as a display are connected. Specifically, the output interfaces are USB terminals or HDMI (registered trademark) (High Definition Multimedia Interface) terminals. Specifically, the display is a LCD (Liquid Crystal Display).

In addition, although the functions of "sections" of the individual devices, which are the mobile station 16, the distribution cache nodes 11, and the resolving device 12, are achieved by software in the present embodiment, the functions of "sections" of the individual devices may be achieved by hardware in a modification.

The structure of the data distribution system 500 according to a modification of the present embodiment will be described with reference to FIG. 18.

Figure 18:
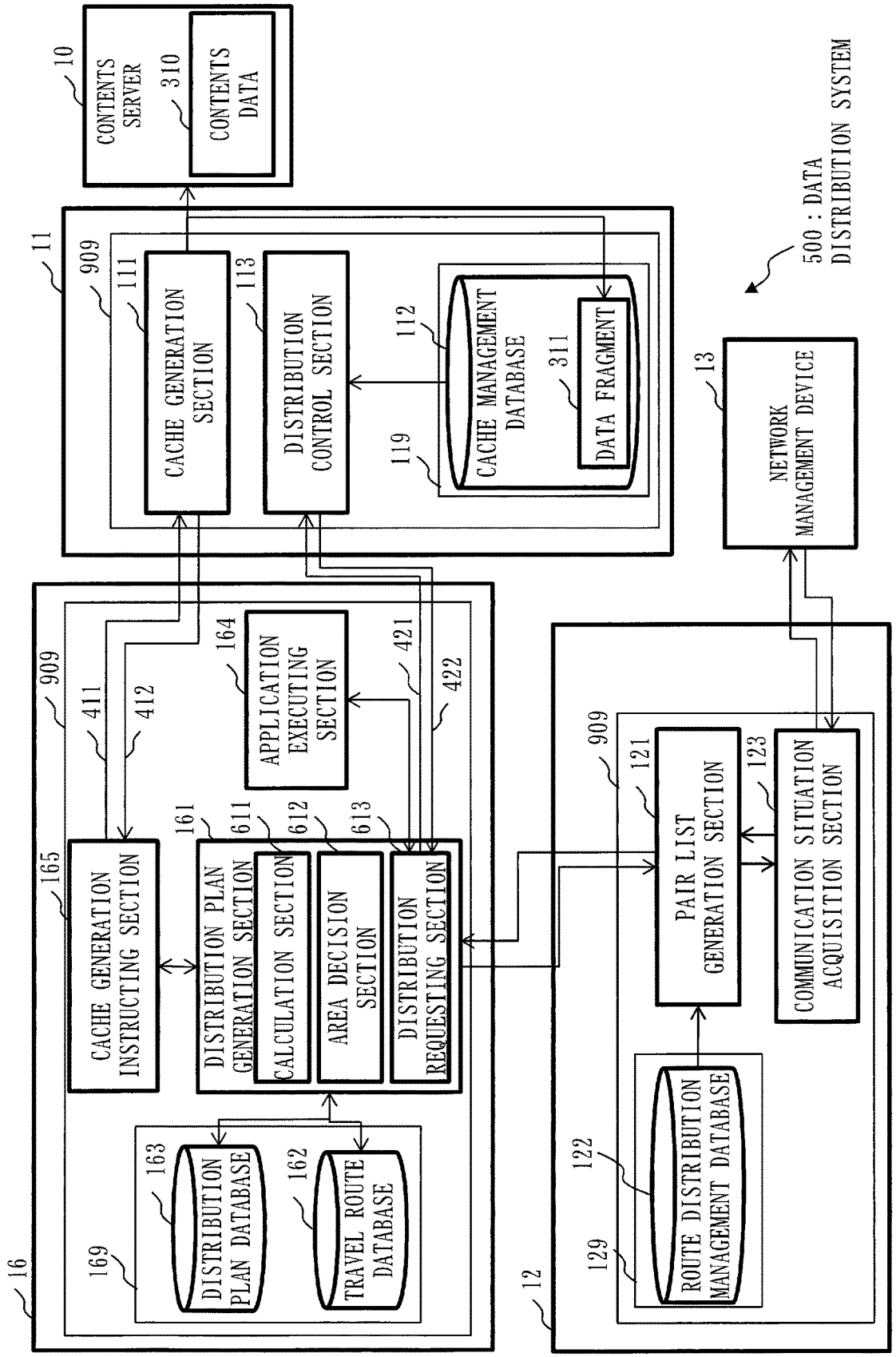
FIG. 18 is a structural diagram illustrating the data distribution system 500 according to a modification of the embodiment 1.

As illustrated in FIG. 1 and FIG. 18, the individual devices, which are the mobile station 16, the distribution cache nodes 11, and the resolving device 12, have hardware such as processing circuits 909 and the communication devices 950.

The processing circuits 909 are specific electronic circuits that achieve the functions of "sections" and the storage sections 169, 129, and 119 described above. Specifically, the processing circuit 909 is a single circuit, a composite circuit, a programmed processor, a parallel-programmed processor, a logic IC, a GA, an ASIC, or a FPGA. GA is an abbreviation for a Gate Array. ASIC is an abbreviation for Application Specific Integrated Circuit. FPGA is an abbreviation for Field-Programmable Gate Array.

The functions of "sections" of the individual devices, which are the mobile station 16, the distribution cache nodes 11, and the resolving device 12, may be achieved by the one processing circuit 909 or by distribution into the plurality of distributed processing circuits 909.

As another modification, the functions of the individual devices, which are the mobile station 16, the distribution cache nodes 11, and the resolving device 12, may be achieved by a combination of software and hardware. That is, the functions of part of the individual devices, which are the mobile station 16, the distribution cache nodes 11, and the resolving device 12, may be achieved by specific hardware and the function of the remaining part may be achieved by software.

The processors 910, the storage devices 920, and the processing circuits 909 of the individual devices, which are the mobile station 16, the distribution cache nodes 11, and the resolving device 12, are collectively referred to as "processing circuitry". That is, regardless of whether the structures of the individual devices, which are the mobile station 16, the distribution cache nodes 11, and the resolving device 12, are those illustrated in FIG. 3 or FIG. 18, the functions of "sections" and the storage sections 169, 129, and 119 of the individual devices are achieved by the processing circuitry.

"Sections" may be read as "processes" or "procedures". In addition, the functions of "sections" may be achieved by firmware.

*Description of the Effects of the Present Embodiment*

In the data distribution system 500 according to the present embodiment, the distribution cache node device is disposed between the mobile station and the contents server in data distribution from the contents server to the mobile body via a wide area network. In addition, the mobile station determines the data distribution plan and instructs data caching to the distribution cache nodes based on the determined distribution plan. In addition, the distribution cache node performs data caching according to the instruction and, if a data distribution request is issued from the mobile station, controls the distribution timing according to the request degree of the data.

In addition, the data distribution system 500 according to the present embodiment has a resolving device that identifies the distribution cache node for which data caching is instructed when the mobile station determines the distribution plan based on the travel route.

In addition, the data distribution system 500 according to the present embodiment has a network management device that provides the necessary data communication speed in the process in which the distribution cache node calculates the size of data to be cached when the mobile station determines the distribution plan.

In addition, the data distribution system 500 according to the present embodiment uses the pair list that manages information provided by the resolving device and information provided by the network management device when the mobile station determines the distribution plan.

In addition, in the process in which the distribution cache node calculates the size of data to be cached when the mobile station determines the distribution plan, the data distribution system 500 according to the present embodiment uses learnable correction coefficients in the calculating expression so that the difference between the planned value and the actual value is gradually reduced.

In addition, when the mobile station determines the distribution plan, the data distribution system 500 according to the present embodiment calculates the size of data to be cached by the distribution cache node device by managing communication with one or more base stations for each distribution cache node.

In addition, when distribution requests are issued from a plurality of mobile stations to the distribution cache node, the data distribution system 500 according to the present embodiment controls the distribution timing using the remaining data amount of the size of the requested data fragment managed by the distribution cache node as the reference of the request degree of the data.

As described above, in the data distribution system 500 according to the present embodiment, the distribution cache node operates as a contents server as seen from the mobile station. In addition, the distribution cache node operates as a client as seen from the contents server. Accordingly, efficient data distribution in a high mobile environment can be achieved without changing the operation of an existing contents distribution service. In addition, since main processing is distributed to the mobile station and the distribution cache nodes, scale-out is easy and high scalability of the number of mobile stations is achieved. In addition, since main changes concerning the introduction of the system are collected in the distribution cache nodes and the mobile station, an existing device does not need to be changed, thereby facilitating application to an existing system. In addition, since the processing is taken over from one distribution cache node to another distribution cache node via processing loads, reduction in the service level of the system can be suppressed.

Embodiment 2

In the present embodiment, the difference with the embodiment 1 will be mainly described.

In the present embodiment, components identical to components described in the embodiment 1 are denoted by the same reference numerals and descriptions thereof may be omitted.

\*\*\*Description of the Structure\*\*\*

In the embodiment 1, when the distribution plan generation section 161 of the mobile station 16 makes a download instruction to the cache generation instructing section 165 and receives failure of the processing result from the cache generation instructing section 165, the distribution plan generation section 161 selects an alternate distribution cache node.

In the present embodiment, when the cache generation instructing section 165 decides that the download instruction is not acceptable, the cache generation instructing section 165 selects a nearby distribution cache node.

It should be noted here that the structure of the data distribution system 500 according to the present embodiment is the same as the structure in the embodiment 1.

\*\*\*Description of Operation\*\*\*

<Download Requesting Processing S165a>

Figure 19:
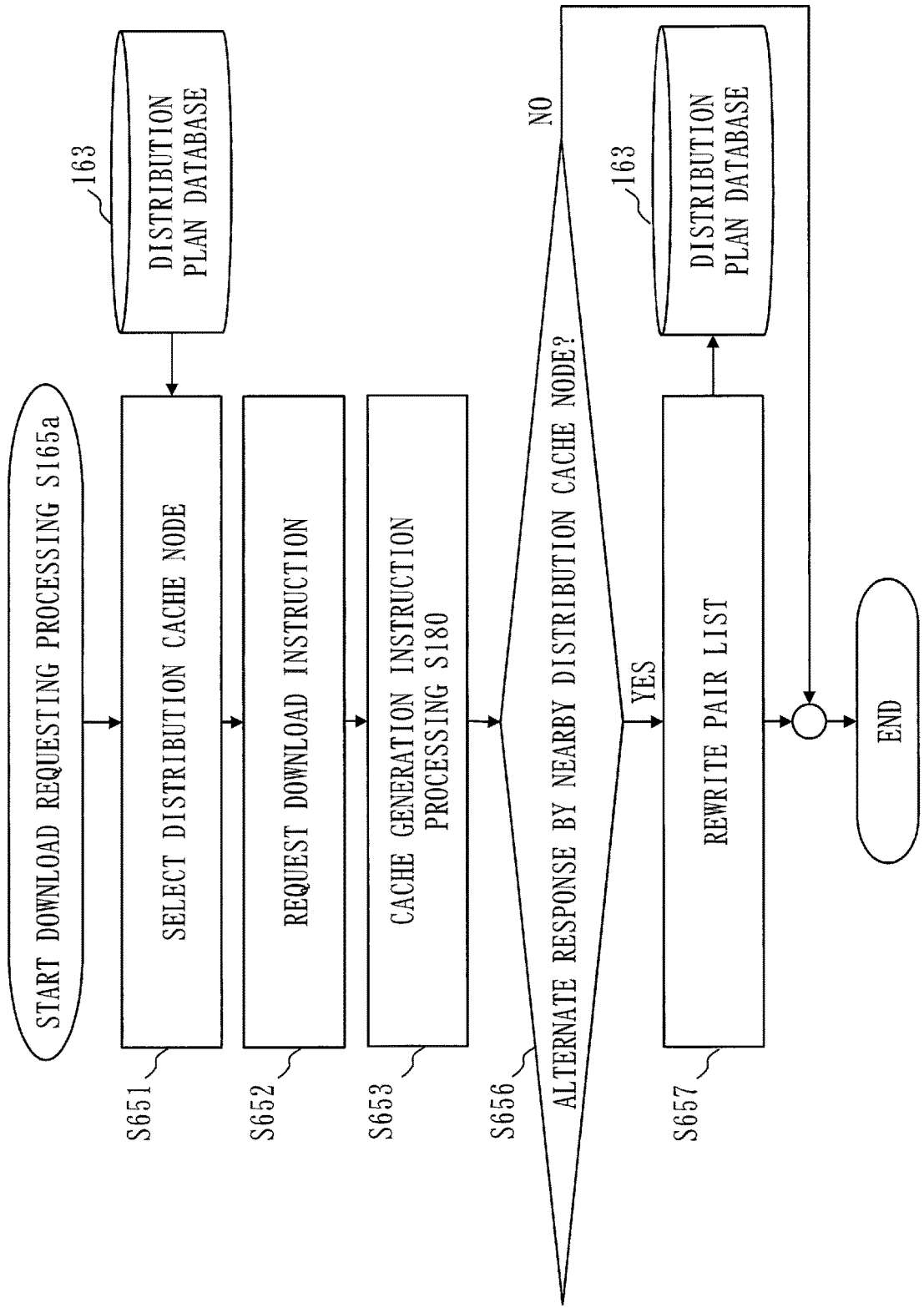
FIG. 19 is a flowchart illustrating download requesting processing S165a according to an embodiment 2.

FIG. 19 is a flowchart illustrating the download requesting processing S165a according to the present embodiment. FIG. 19 is the flowchart when an alternate distribution cache node is selected as a nearby distribution cache node.

Figure 20:
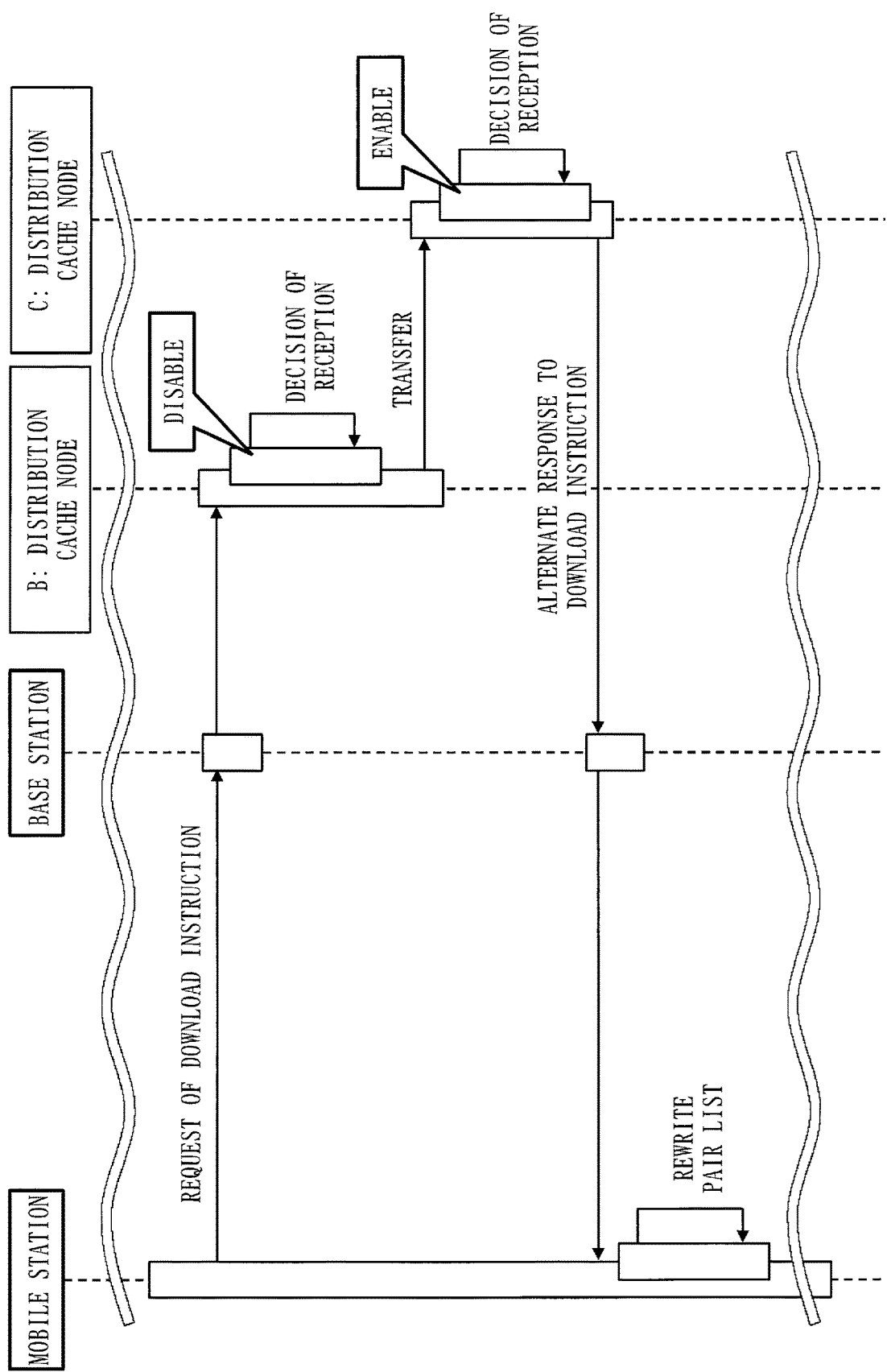
FIG. 20 is a sequence diagram illustrating the download requesting processing S165a according to the embodiment 2.

FIG. 20 is a sequence diagram illustrating the download requesting processing S165a according to the present embodiment. FIG. 20 is a sequence diagram when an alternate distribution cache node is selected as a nearby distribution cache node.

The processing in the step S651 and the processing in the step S652 are the same as the processing described in the embodiment 1.

In the step S653, the cache generation instruction processing S180 is performed by the cache generation instructing section 165. The processing in the cache generation instruction processing S180 is the same as the processing described in the embodiment 1.

In a step S656, the distribution plan generation section 161 decides whether the processing result is an alternate response by a nearby distribution cache node. When the processing result is an alternate response, the processing proceeds to a step S657. When the processing result is not an alternate response, the processing ends.

In the step S657, the distribution plan generation section 161 rewrites the entry of the original distribution cache node in the pair list with the nearby distribution cache node having alternately responded and stores it in the distribution plan database 163.

FIG. 21 illustrates an example of the pair list rewritten in the step S657.

In the pair list in FIG. 21, the distribution cache node on the first row subjected to an alternate respond has been rewritten with the nearby distribution cache node having accepted the download instruction.

<Cache Generation Processing S190a>

Figure 22:
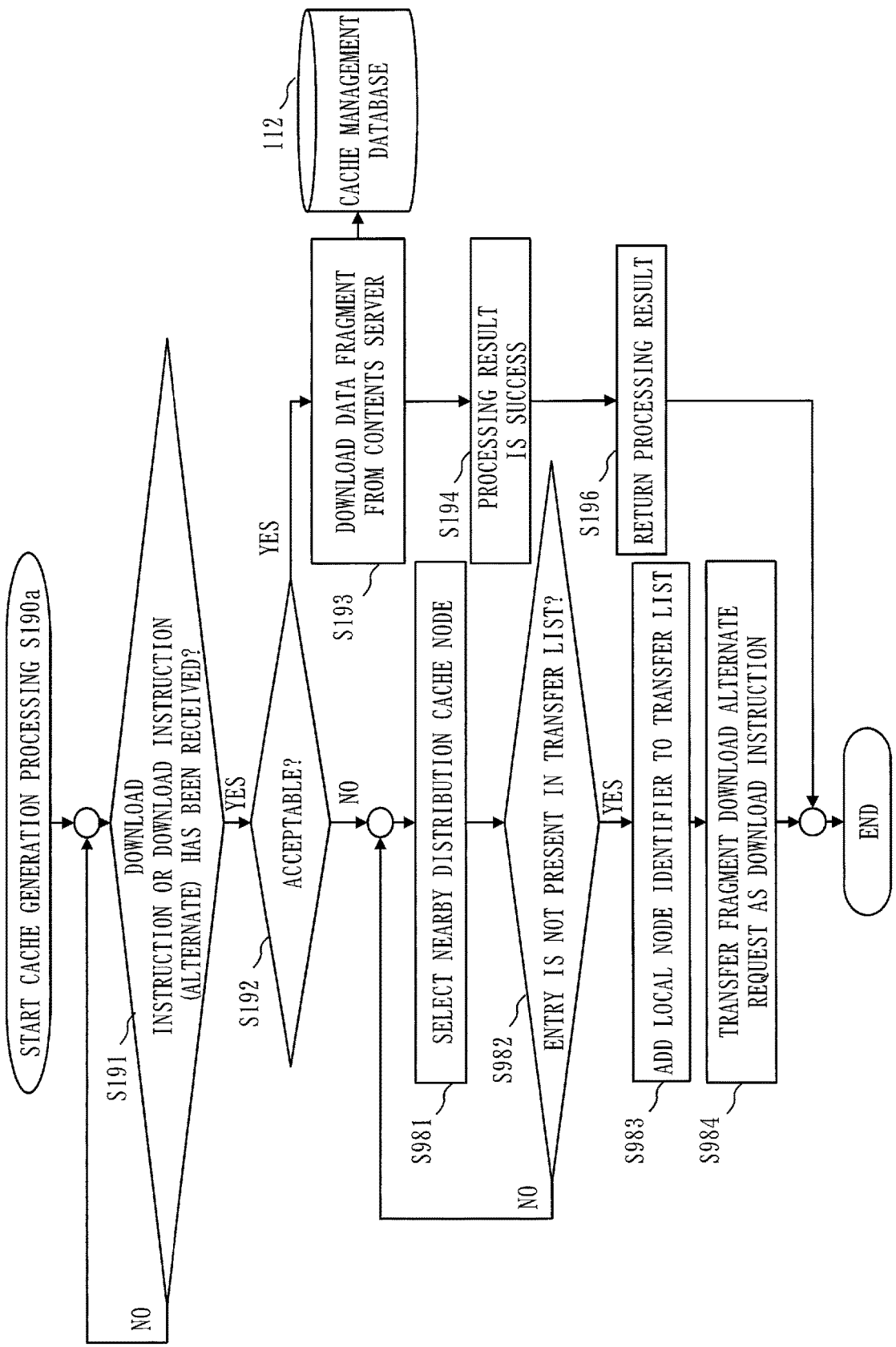
FIG. 22 is a flowchart illustrating cache generation processing S190a according to the embodiment 2.

FIG. 22 is a flowchart illustrating the cache generation processing S190a according to the present embodiment. The cache generation processing S190a is executed by the cache generation section 111 of the distribution cache node 11. In the cache generation processing S190a, when the download instruction is not acceptable in the distribution cache node, alternate processing by a nearby distribution cache node is performed.

The step S191, the step S192, the step S193, the step S194, and the step S196 are the same as the processing described in the embodiment 1.

When it is decided that the download instruction is not acceptable in the step S192, the processing proceeds to a step S981.

In the step S981, the cache generation section 111 selects a nearby distribution cache node.

In a step S982, the cache generation section 111 decides whether an entry of a nearby distribution cache node is present in a transfer list. When an entry of a nearby distribution cache node is present in the transfer list, the processing returns to the step S981 and the process from the selection of a nearby distribution cache node is redone. When the entry is not present in the transfer list, the processing proceeds to a step S983.

In the step S983, since the cache generation section 111 has confirmed that the entry of a nearby distribution cache node is not present in the transfer list, the cache generation section 111 adds its identifier to the transfer list.

After that, in a step S984, the cache generation section 111 transfers a download instruction of a data fragment to the nearby distribution cache node.

The transfer list is information included in a download instruction. Each time the distribution cache node transfers a download instruction, the distribution cache node adds the identifier of its own node to the transfer list. This processing prevents a download instruction from looping.

\*\*\* Description of the Effects of the Present Embodiment\*\*\*

As described above, the data distribution system according to the present embodiment can perform alternate processing in the distribution cache node when the distribution cache node cannot accept the download instruction.

Embodiment 3

In the present embodiment, the difference with the embodiment 1 will be mainly described. In the present embodiment, components identical to components described in the embodiment 1 are denoted by the same reference numerals and descriptions thereof may be omitted.

FIG. 23 is an entire structural diagram illustrating the data distribution system 500 according to the embodiment 1 used for comparison with the present embodiment. FIG. 24 is an entire structural diagram illustrating a data distribution system 500a according to the present embodiment.

As illustrated in FIG. 23, in the embodiment 1, one distribution cache node 11 may manage the communication ranges 151 of the plurality of base stations 15 as the communication areas 150. In the present embodiment, a case in which one distribution cache node 11 manages a plurality of geographic regions 152 obtained by geographical division as the communication areas 150 will be described as illustrated in FIG. 24. The plurality of geographic regions 152 obtained by geographical division are also referred to as a plurality of cells.

Although the basic operation is the same as in the embodiment 1, the resolving device 12 resolves the distribution cache nodes to be connected and the cell information of the management ranges thereof based on the travel route. In the present embodiment, the pair list is configured by cells in place of base stations.

As illustrated in FIG. 24, the travel route 20 passes through the communication areas 150 including the plurality of geographic regions 152 in the present embodiment. The data distribution system includes the plurality of distribution cache nodes 11. The plurality of distribution cache nodes 11 respectively manage the plurality of geographic regions 152 as the communication areas 150.

It should be noted here that the resolving device 12 generates a pair list in which the plurality of distribution cache nodes 11 are arranged in the order of the travel route 20 based on the travel route 20 and correspondence with the geographic region 152 (that is, a cell) managed by each of the plurality of distribution cache nodes 11 is made.

As described above, the data distribution system 500*a* according to the present embodiment manages communication with a single cell or a plurality of cells obtained by geographic division for each distribution cache node when the mobile station determines a distribution plan. Then, the mobile station calculates the size of data to be cached by the distribution cache node. By changing the management unit by the distribution cache node from base stations to cells, the mobile station does not need to grasp the base station to be connected and communication can be assumed to be a black box. Accordingly, in the data distribution system 500*a* according to the present embodiment, even when the base station information cannot be acquired, the data distribution method can be applied.

Embodiment 4

In the present embodiment, the difference with the embodiment 1 will be mainly described.

In the present embodiment, components identical to components described in the embodiment 1 are denoted by the same reference numerals and descriptions thereof may be omitted.

In the embodiment 1, as illustrated in the step S215 to the step S223 in FIG. 17, the remaining data amount is used as the priority of distribution in distribution control processing S210 by the distribution cache node 11.

In the present embodiment, the distribution requesting section 613 of the mobile station 16 puts priority information 423 indicating the priority of distribution of a data fragment in the distribution request 421. The distribution control section 113 of the distribution cache node 11 controls the distribution of the data fragment based on the priority information 423 included in the distribution request 421. Here, the priority information 423 is the resource information of the distribution cache node device, the data type of a data fragment, or the like. Specifically, in the present embodiment, information such as the buffer remaining amount and the data type used by the application executing section 164 of the mobile station 16 is used as the priority information 423 of distribution in place of the remaining data amount.

Although the basic operation is the same as in the embodiment 1, the mobile station puts information such as the buffer remaining amount and the data type used by the application executing section 164 in a distribution request transmitted by the mobile station to the distribution cache node. In distribution control processing S210 by the distribution cache node 11, the distribution cache node 11 distributes a data fragment having a small buffer remaining amount preferentially. In addition, the distribution cache node 11 may determine the priority according to the characteristics of the data type. Specifically, it is determined that a moving image is prioritized when the data type is a program or a moving image.

As described above, in the data distribution system according to the present embodiment, when the distribution cache node receives distribution requests from a plurality of mobile stations, the distribution cache node uses one or a combination of the buffer remaining amount and the data type used by an application of the mobile station as priority information. That is, the data distribution system according to the present embodiment can use the buffer remaining amount and the data type used by the application of the mobile station in place of the remaining data amount, as the reference of the request degree of the data. Therefore, the data distribution system according to the present embodiment can perform distribution based on the request degree of the data of an application executed in the mobile station.

In the embodiment described above, individual "sections" form the individual devices of the data distribution system as independent functional blocks. However, the individual devices do not need to have the structures described above and may have any structures. The functional blocks of the individual devices of the data distribution system may have any structure as long as the functions described in the above embodiment are achieved. The individual devices of the data distribution system may be configured by using any combination of these functional blocks or using any block structure.

In addition, each of the individual devices of the data distribution system may include a plurality of devices instead of one device.

Although the embodiments 1 to 4 have been described, a plurality of parts of these embodiments may be combined and practiced. Alternatively, one part of these embodiments may be practiced. Other than this, these embodiments may be practiced by combining them in entirely or partially any way.

It should be noted here that the embodiments described above are preferable examples essentially, do not intend to restrict the ranges of the present invention, applications thereof, and usage, and may be changed as necessary.

REFERENCE SIGNS LIST

10: contents server, 11: distribution cache node, 12: resolving device, 13: network management device, 14: Internet, 15: base station, 16: mobile station, 20: travel route, 21: distribution device, 26: mobile body, 111: cache generation section, 112: cache management database, 113: distribution control section, 119, 129, 169: storage section, 121: pair list generation section, 122: route distribution management database, 123: communication situation acquisition section, 150: communication area, 151: communication range, 152: geographic region, 161: distribution plan generation section, 162: travel route database, 163: distribution plan database, 164: application executing section, 165: cache generation instructing section, 211: pair list, 212: extended pair list, 310: contents data, 311: data fragment, 411: download instruction, 421: distribution request, 423: priority information, 500, 500*a*: data distribution system, 510: data distribution method, 521: mobile station program, 522: distribution device program, 611: calculation section, 612: area decision section, 613: distribution requesting section, 909: processing circuit, 910: processor, 920: storage device, 950: communication device, S10: mobile station processing, S20: area decision processing, S180: cache generation instruction processing, S30: distribution requesting processing, S190, S190*a*: cache generation processing, S210: distribution control processing.

The invention claimed is:

1. A data distribution system that distributes contents data stored in a contents server to a mobile body that travels on a travel route that passes through a communication area, the data distribution system comprising: a mobile station installed in the mobile body, the mobile station having processing circuitry that transmits a download instruction for downloading, from the contents server as one of a plurality of data fragments, a part of the contents data to be distributed to the mobile body when the mobile body is traveling in the communication area, wherein the processing circuitry transmits other download instructions for downloading other parts of the contents data as other ones of the plurality of data fragments; and a distribution device to manage data distribution in the communication area, the distribution device including processing circuitry that receives one of the transmitted download instructions, downloads a corresponding one of the data fragments from the contents server based on the received download instruction, and stores the downloaded data fragment, wherein, for each download instruction, the processing circuitry of the mobile station calculates a size of a corresponding one of the data fragments based on the travel route and a communication situation between the distribution device and the mobile station, and transmits each download instruction based on the calculated size of the corresponding data fragment, and wherein the travel route passes through the communication area including a plurality of communication ranges corresponding to a plurality of base stations, and the data distribution system manages the data distribution in the communication area in such manner that different ones of the plurality of data fragments are downloaded from the contents server to the mobile station via different ones of the plurality of base stations.

2. The data distribution system according to claim 1, wherein the processing circuitry of the mobile station corrects the size of the one of the plurality of data fragments based on a travel environment of the mobile body.

3. The data distribution system according to claim 1, wherein the processing circuitry of the mobile station decides whether the mobile body is traveling in a particular communication range of the communication area and transmits a distribution request of the data fragment corresponding to the particular communication range to the distribution device when it is decided that the mobile body is traveling in the particular communication range, and the processing circuitry of the distribution device distributes the stored data fragment to the mobile station based on the distribution request when receiving the distribution request from the processing circuitry of the mobile station.

4. The data distribution system according to claim 3, the data distribution system includes a plurality of the distribution devices and the plurality of distribution devices respectively communicate with the plurality of base stations corresponding to the plurality of distribution devices, respectively, and the data distribution system includes a resolving device to generate a pair list in which a plurality of distribution identifiers that identify the plurality of distribution devices, respectively, are arranged in an order of the travel route based on the travel route and the base stations respectively corresponding to the distribution devices identified by the plurality of distribution identifiers, respectively, are associated with the plurality of distribution identifiers, respectively.

5. The data distribution system according to claim 4, wherein the pair list includes the communication situation between the distribution devices identified by the plurality of distribution identifiers, respectively, and the mobile station and the processing circuitry of the mobile station acquires the pair list from the resolving device and acquires the communication situation from the acquired pair list.

6. The data distribution system according to claim 5, wherein the data distribution system includes a network management device to transmit the communication situation between each of the plurality of distribution devices and the mobile station to the resolving device.

7. The data distribution system according to claim 3, wherein the processing circuitry of the distribution device transmits a part of the data fragment that corresponds to a time slot to the mobile station and, when receiving the distribution request, controls distribution of the data fragment based on a data remaining amount obtained by subtracting an amount of transmitted data from the data fragment.

8. The data distribution system according to claim 3, wherein the processing circuitry of the mobile station puts priority information indicating priority of distribution of the data fragment in the distribution request and the processing circuitry of the distribution device controls distribution of the data fragment based on the priority information included in the distribution request.

9. The data distribution system according to claim 8, wherein the priority information is resource information of the distribution device or a data type of the data fragment.

10. A data distribution system that distributes contents data stored in a contents server to a mobile body that travels on a travel route that passes through a communication area, the data distribution system comprising:

a mobile station installed in the mobile body, the mobile station having processing circuitry that transmits a download instruction for downloading, from the contents server as a data fragment, a part of the contents data to be distributed to the mobile body when the mobile body is traveling in the communication area; and a distribution device to manage data distribution in the communication area, the distribution device including processing circuitry that receives the transmitted download instruction, downloads the data fragment from the contents server based on the received download instruction, and stores the downloaded data fragment, wherein the processing circuitry of the mobile station
calculates a size of the data fragment based on the travel route and a communication situation between the distribution device and the mobile station,
transmits the download instruction based on the size of the calculated data fragment, and
decides whether the mobile body is traveling in the communication area and transmits a distribution request of the data fragment to the distribution device when it is decided that the mobile body is traveling in the communication area, wherein the processing circuitry of the distribution device distributes the stored data fragment to the mobile station based on the distribution request when receiving the distribution request from the processing circuitry of the mobile station, wherein the travel route passes through the communication area including a plurality of geographic regions and the data distribution system includes a plurality of the distribution devices and the plurality of distribution devices respectively manage the plurality of geographic regions as the communication area, and the data distribution system includes a resolving device to generate a pair list in which a plurality of distribution identifiers that identify the plurality of distribution devices, respectively, are arranged in an order of the travel route based on the travel route and the geographic regions respectively managed by the distribution devices identified by the plurality of distribution identifiers, respectively, are associated with the plurality of distribution identifiers, respectively.

11. A mobile station installed in a mobile body traveling on a travel route passing through a communication area, contents data stored in a contents server being distributed to the mobile station by at least one distribution device, the mobile station comprising:

processing circuitry to transmit, to the distribution device, a download instruction that downloads, as one of a plurality of data fragments, a part of the contents data to be distributed to the mobile body when the mobile body is traveling in the communication area, from the contents server, wherein the processing circuitry transmits other download instructions for downloading other parts of the contents data as other ones of the plurality of data fragments, to decide whether the mobile body is traveling in a communication range of the communication area corresponding to a particular one of the download instructions, to transmit a distribution request of the data fragment, which corresponds to the particular download instruction, to the at least one distribution device when it is decided that the mobile body is traveling in the corresponding communication range of the communication area, and to calculate a size of the data fragment corresponding to the particular download request based on the travel route and a communication situation between the at least one distribution device and the mobile station, wherein the processing circuitry transmits the particular download instruction based on the calculated size of the data fragment corresponding to the particular download instruction, wherein the travel route passes through the communication area including a plurality of communication ranges corresponding to a plurality of base stations, and the contents data is distributed to the mobile body in such manner that different ones of the plurality of data fragments are downloaded from the contents server to the mobile station via different ones of the plurality of base stations.

12. A distribution device that distributes contents data stored in a contents server to a mobile body traveling on a travel route passing through a communication area, the distribution device comprising:

processing circuitry to download a data fragment from the contents server based on a download instruction that downloads, from the contents server as one of a plurality of data fragments, a part of the contents data to be distributed to the mobile body when the mobile body is traveling in the communication area after receiving the download instruction from a mobile station installed in the mobile body, and store the downloaded data fragment, wherein other parts of the contents data are downloaded as other ones of the plurality of data fragments by other distribution devices in response to other respective download instructions, and to distribute the stored data fragment to the mobile station based on a distribution request when receiving the distribution request that requests distribution of the data fragment from the mobile station, wherein the processing circuitry receives the download instruction which is transmitted based on a size of the data fragment, the size of the data fragment being calculated based on the travel route and a communication situation between the distribution device and the mobile station, and wherein the travel route passes through the communication area including a plurality of communication ranges corresponding to a plurality of base stations, and the processing circuitry distributes the stored data fragment via a particular one of the plurality of base stations corresponding to a particular one of the plurality of communication ranges in which the mobile body is traveling when the distribution request is received, the other ones of the plurality of data fragments being distributed to the mobile station from the other distribution devices via respective other ones of the plurality of base stations.

13. A data distribution method of a data distribution system that distributes contents data stored in a contents server to a mobile body traveling on a travel route passing through a communication area, the data distribution method comprising:

receiving a download instruction transmitted from a mobile station on the mobile body that downloads, from the contents server as one of a plurality of data fragments, a part of the contents data to be distributed to the mobile body when the mobile body is traveling in the communication area, wherein other download instructions are transmitted from the mobile station for downloading other parts of the contents data as other ones of the plurality of data fragments;

for each of the download instructions transmitted from the mobile station, downloading a corresponding one of the plurality of data fragments from the contents server based on the received download instruction, and storing the downloaded data fragment; and calculating a size of the corresponding data fragment based on the travel route and a communication situation between the distribution device and the mobile station and to transmit the download instruction based on the calculated size of the data fragment, wherein the travel route passes through the communication area including a plurality of communication ranges corresponding to a plurality of base stations, and the data distribution method manages the data distribution in the communication area in such manner that different ones of the plurality of data fragments are downloaded from the contents server to the mobile station via different ones of the plurality of base stations.

14. A non-transitory computer readable medium storing a mobile station program for a mobile station installed in a mobile body traveling on a travel route passing through a communication area, the mobile station receiving contents data stored in a contents server from at least one distribution device, the program causing the mobile station that is a computer to execute:

cache generation instruction processing to transmit, to the distribution device, a download instruction that downloads, from the contents server as one of a plurality data fragments, a part of the contents data to be distributed to the mobile body when the mobile body is traveling in the communication area, wherein the code generation instruction processing transmits other download instructions for downloading other parts of the contents data as other ones of the plurality of data fragments;

area decision processing to decide whether the mobile body is traveling in a communication range of the communication area corresponding to a particular one of the download instructions;

distribution requesting processing to transmit a distribution request of the data fragment, which corresponds to the particular download instruction, to the at least one distribution device when it is decided that the mobile body is traveling in the corresponding communication range of the communication area;

calculation processing to calculate a size of the data fragment corresponding to the particular download instruction based on the travel route and a communication situation between the at least one distribution device and the mobile station; and processing to transmit the particular download instruction based on the size of the data fragment corresponding to the particular download instruction calculated by the calculation processing, wherein the travel route passes through the communication area including a plurality of communication ranges corresponding to a plurality of base stations, and the contents data is distributed to the mobile body in such manner that different ones of the plurality of data fragments are downloaded from the contents server to the mobile station via different ones of the plurality of base stations.

15. A non-transitory computer readable medium storing a distribution device program for a distribution device that has processing circuitry and distributes contents data stored in a contents server to a mobile body traveling on a travel route passing through a communication area, the distribution device program causing the distribution device that is a computer to execute:

cache generation processing to download a data fragment from the contents server based on a download instruction that downloads, from the contents server as one of a plurality of data fragments, a part of the contents data to be distributed to the mobile body when the mobile body is traveling in the communication area after receiving the download instruction from a mobile station installed in the mobile body, and store the downloaded data fragment, wherein other parts of the contents data are downloaded as other ones of the plurality of data fragments by other distribution device in response to other respective download instructions;

distribution control processing to distribute the stored data fragment to the mobile station based on a distribution request when receiving the distribution request that requests distribution of the data fragment from the mobile station; and processing to receive the download instruction which is transmitted based on a size of the data fragment, the size of the data fragment being calculated based on the travel route and a communication situation between the distribution device and the mobile station, wherein the travel route passes through the communication area including a plurality of communication ranges corresponding to a plurality of base stations, and the distribution control processing distributes the stored data fragment via a particular one of the plurality of base stations corresponding to a particular one of the plurality of communication ranges in which the mobile body is traveling when the distribution request is received, the other ones of the plurality of data fragments being distributed to the mobile station from the other distribution devices via respective other ones of the plurality of base stations.

* * * * *